(12) United States Patent
Kudo

(10) Patent No.: US 6,898,159 B2
(45) Date of Patent: May 24, 2005

(54) EDITING APPARATUS AND METHOD CAPABLE OF ERASING A PREDETERMINED PROGRAM ON A SELECTED PLAY-LIST

(75) Inventor: Shigetaka Kudo, Tokyo (JP)

(73) Assignee: Sony Corporation, Tokyo (JP)

(*) Notice: Subject to any disclaimer, the term of this patent is extended or adjusted under 35 U.S.C. 154(b) by 100 days.

(21) Appl. No.: 10/398,113

(22) PCT Filed: Jul. 15, 2002

(86) PCT No.: PCT/JP02/07165

§ 371 (c)(1),
(2), (4) Date: Apr. 2, 2003

(87) PCT Pub. No.: WO03/015099

PCT Pub. Date: Feb. 20, 2003

(65) Prior Publication Data

US 2004/0027930 A1 Feb. 12, 2004

(30) Foreign Application Priority Data

Aug. 3, 2001 (JP) ...................... 2001-237176

(51) Int. Cl.[7] ............................................. G11B 21/08
(52) U.S. Cl. ............................... 369/30.05; 369/30.19; 369/83
(58) Field of Search .......................... 369/30.05, 30.19, 369/30.08, 30.04, 30.07, 30.09, 30.18, 47.13, 83; 386/52, 54, 64, 57, 125

(56) References Cited

U.S. PATENT DOCUMENTS 6,128,255 A * 10/2000 Yankowski ............... 369/30.06
6,185,163 B1 * 2/2001 Bickford et al. ......... 369/30.08
6,421,499 B1 * 7/2002 Kim et al. ..................... 386/95
6,542,445 B2 * 4/2003 Ijichi et al. .............. 369/30.08

FOREIGN PATENT DOCUMENTS

| JP | 2000-348467 A | 12/2000 |
| JP | 2001-202085 A | 7/2001 |
| JP | 2002-175680 A | 6/2002 |

OTHER PUBLICATIONS

JP–2002–175,680A (English Abstract), Jun. 21, 2002.*
JP–2001–202,085A (English Abstract), Jul. 27, 2001.*
JP–2000–348,467A (English abstract), Dec. 15, 2000.*

* cited by examiner

Primary Examiner—Tan Dinh
(74) Attorney, Agent, or Firm—Wolf, Greenfield & Sacks, P.C.

(57) ABSTRACT

The user properly operates an operating apparatus of a system controller 100 and enters an album number and a track number of a track which he wants to erase. The system controller 100 discriminates whether the track corresponding to those numbers has been registered in a play list of an HD recording and reproducing apparatus 300 or not. If it is determined that the track has been registered in the play list, a warning is displayed on a display apparatus of the system controller 100. After confirming this display, if it is possible to erase the track, the user properly operates the operating apparatus and commits the track erasure. The system controller 100 erases the track whose erasure is desired from the HD recording and reproducing apparatus 300 and erases information corresponding to the erased track from the play list.

26 Claims, 42 Drawing Sheets

| FRAME | P | Q | R | S | T | U | V | W |
|---|---|---|---|---|---|---|---|---|
| F1 | S0 | | | | | | | |
| F2 | S1 | | | | | | | |
| F3 | P1 | Q1 | R1 | S1 | T1 | U1 | V1 | W1 |
| F4 | P2 | Q2 | R2 | S2 | T2 | U2 | V2 | W2 |
| ⋮ | ⋮ | ⋮ | ⋮ | ⋮ | ⋮ | ⋮ | ⋮ | ⋮ |
| F95 | P93 | Q93 | R93 | S93 | T93 | U93 | V93 | W93 |
| F96 | P94 | Q94 | R94 | S94 | T94 | U94 | V94 | W94 |
| F97 | P95 | Q95 | R95 | S95 | T95 | U95 | V95 | W95 |
| F98 | P96 | Q96 | R96 | S96 | T96 | U96 | V96 | W96 |

| | BLKID-TL0 | | T-ALB | REVISION | | | |
|---|---|---|---|---|---|---|---|
| 0x0000 | | | | | | | |
| 0x0010 | | | | | | | |
| 0x0020 | | | | | | | |
| 0x0120 | | | | | | | |
| 0x0320 | | | | | | | |
| 0x0330 | | | | | | | |
| 0x0350 | Alb-001 | Alb-002 | Alb-003 | Alb-004 | Alb-005 | Alb-006 | Alb-007 | Alb-008 |
| 0x0360 | Alb-009 | Alb-010 | Alb-011 | Alb-012 | Alb-013 | Alb-014 | Alb-015 | Alb-016 |
| 0x0740 | Alb-505 | Alb-506 | Alb-507 | Alb-508 | Alb-509 | Alb-510 | | |
| 0x3ff0 | BLKID-TL0 | | | REVISION | | | | |

Fig. 14A

| 0x0000 | BLKID-TL0 | T-ALB | REVISION |
|---|---|---|---|
| 0x0010 | | | |

Fig. 14B

| 0x0020 | | | | | | | | | |
| --- | --- | --- | --- | --- | --- | --- | --- | --- | --- |
| 0x0120 | | | | | | | | | |
| 0x0320 | | | | | | | | | |
| 0x0330 | | | | | | | | | |
| 0x0350 | Alb-001 | Alb-002 | Alb-003 | Alb-004 | Alb-005 | Alb-006 | Alb-007 | Alb-008 | |
| 0x0360 | Alb-009 | Alb-010 | Alb-011 | Alb-012 | Alb-013 | Alb-014 | Alb-015 | Alb-016 | |
| 0x0740 | Alb-505 | Alb-506 | Alb-507 | Alb-508 | Alb-509 | Alb-510 | | | |
| 0x3ff0 | BLKID-TL0 | | | T-ALB | | REVISION | | | |

Fig. 18

| | BLKID-TL0 | Reserved | Mcode | REVISION | Reserved |
|---|---|---|---|---|---|
| 0x0000 | SN1C+L | SN2C+L | SINFSIZE | T-TRK | Reserved |
| 0x0020 | NM1-S(256) | | | | |
| 0x0120 | NM1-S(512) | | | | |
| 0x0320 | Reserved | | | | |
| 0x0330 | Reserved | | | | |
| 0x0350 | TRK-001 | TRK-002 | TRK-003 | TRK-004 | TRK-005 | TRK-006 | TRK-007 | TRK-008 |
| 0x0360 | TRK-009 | TRK-010 | TRK-011 | TRK-012 | TRK-013 | TRK-014 | TRK-015 | TRK-016 |
| 0x0660 | TRK-393 | TRK-394 | TRK-395 | TRK-396 | TRK-397 | TRK-398 | TRK-399 | TRK-400 |
| 0x0670 | INF-S(14720) | | | | |
| 0x3ff0 | BLKID-TL0 | Reserved | Mcode | REVISION | Reserved |

(Columns at 0x0320–0x0330 include CONTENTSKEY, C_MAC[0], S-YMDhms fields)

Fig. 19A

| 0x0000 | | BLKID-TL0 | Reserved | Mcode | REVISION |
|---|---|---|---|---|---|
| | SN1C+L | SN2C+L | SINFSIZE | T-TRK | Reserved | Reserved |

Fig. 19B

| 0x0020 | NM1-S(256) | | | | | | | |
|---|---|---|---|---|---|---|---|---|
| 0x0120 | NM1-S(512) | | | | | | | |
| 0x0320 | Reserved | | | | | | | |
| 0x0330 | Reserved | | | | | CONTENTSKEY | | |
| | | | | | | C_MAC[0] | | S-YMDhms |
| 0x0350 | TRK-001 | TRK-002 | TRK-003 | TRK-004 | TRK-005 | TRK-006 | TRK-007 | TRK-008 |
| 0x0360 | TRK-009 | TRK-010 | TRK-011 | TRK-012 | TRK-013 | TRK-014 | TRK-015 | TRK-016 |
| 0x0660 | TRK-393 | TRK-394 | TRK-395 | TRK-396 | TRK-397 | TRK-398 | TRK-399 | TRK-400 |
| 0x0670 | INF-S(14720) | | | | | | | |
| 0x3ff0 | BLKID-TL0 | Reserved | Mcode | REVISION | | | | Reserved |

Fig. 19C

| INF | 0x00 | ID | 0x00 | SIZE | Mcode | C+L | Reserved | DATA VARIABLE LENGTH |
|---|---|---|---|---|---|---|---|---|

Fig. 20

| Addr | | | | | | | |
|---|---|---|---|---|---|---|---|
| 0x0000 | BLKID-HD0 | Reserved | Mcode | REVISION | | BLOCK SERIAL | |
| 0x0010 | N1C+L | N2C+L | INFSIZE | T-PRT | T-SU | INX | XT |
| 0x0020 | NM1(256) | | | | | | |
| 0x0120 | NM1(512) | | | | | | |
| 0x0310 | | | | | | | |
| 0x0320 | Reserved | | | CONTENTSKEY | | | |
| | Reserved | | | C_MAC[n] | | | |
| | — Reserved | | | | WM | A | LT | FNo |
| | MG(D)SERIAL-nnn(Upper) | | | MG(D)SERIAL-nnn(Lower) | | | |
| 0x0360 | CONNUM | | YNDhms-S | YNDhms-E | MT | CT | CC | CN |
| 0x0370 | PRTSIZE | | PRTKEY | | | Reserved | |
| 0x0380 | | | CONNUM-0 | PRTSIZE(0x0388) | | PRTKEY | |
| 0x0390 | | | | | | CONNUM-0 | |

THE START POSITION OF INF(0x0400)INF
DIFFERS IN DEPENDENCE ON THE NUMBER OF PRTINF

| | | | | | | |
|---|---|---|---|---|---|---|
| 0x3FF0 | BLKID-HD0 | Reserved | Mcode | Reserved | BLOCK SERIAL |
| 0x4000 | BLKID-A3D | Reserved | Mcode | CONNUM-0 | BLOCK SERIAL |
| 0x4010 | BLOCK SERIAL | | | INITIALIZATION VECTOR | |
| 0x4020 | SU-000(Nbyte = 384byte) | | | | |
| 0x41A0 | SU-001(Nbyte) | | | | |
| 0x4320 | SU-002(Nbyte) | | | | |
| 0x04A0 | SU-041(Nbyte) | | | | |
| 0x7DA0 | Reserved(Nbyte = 208byte) | | | | |
| 0x7F20 | BLOCK SEED | | | | |
| 0x7FF0 | BLKID-A3D | Reserved | Mcode | CONNUM-0 | BLOCK SERIAL |

Fig. 21

|  | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0x0000 | BLKID-HD0 | | | | Reserved | | Mcode | | Reserved | | | | BLOCK SERIAL | | | |
| 0x0010 | N1C+L | | N2C+L | | INFSIZE | | T-PRT | | T-SU | | | | INX | | XT | |
| 0x0020 | NM1(256) | | | | | | | | | | | | | | | |
| 0x0120 | NM2(512) | | | | | | | | | | | | | | | |
| 0x0310 | | | | | | | | | | | | | | | | |

Fig. 22

| | | | | | | | |
|---|---|---|---|---|---|---|---|
| 0x0320 | Reserved (8) | | | CONTENTSKEY | | | |
| | Reserved (8) | | | MAC | | | |
| | Reserved (12) | | | | A | LT | FNo |
| | MG(D)SERIAL-nnn | | | | | | |
| 0x0360 | CONNUM | YMDhms-S | | YMDhms-E | MT | CT | CC | CN |

Fig. 23 bit7: MODE OF ATRAC3    0:Dual    1:Joint
bit6,5,4        N OF 3 BITS IS A VALUE OF MODE

| N | MODE | TIME | TRANSFER RATE | SU | BYTES |
|---|------|------|---------------|-----|-------|
| 7 | HQ | 47min | 176kbps | 31SU | 512 |
| 6 |    | 58min | 146kbps | 38SU | 424 |
| 5 | EX | 64min | 132kbps | 42SU | 384 |
| 4 | SP | 81min | 105kbps | 53SU | 304 |
| 3 |    | 90min | 94kbps  | 59SU | 272 |
| 2 | LP | 128min | 66kbps | 84SU | 192 |
| 1 | mono | 181min | 47kbps | 119SU | 136 |
| 0 | mono | 258min | 33kbps | 169SU | 96 | bit3: Reserved
bit2: DATA DIVISION          0:AUDIO              1:OTHERS
bit1: REPRODUCTION SKIP   0:NORMAL REPRODUCTION   1:SKIP
bit0: EMPHASIS               0:OFF                1:ON(50/15 μS)

Fig. 24

HCMS bit7    COPY PERMISSION    0:COPY NEVER    1:COPY FREELY bit6    GENERATION    0:ORIGINAL    1:THE 1st GENERATION OR MORE bit5-4    COPY CONTROL REGARDING HIGH SPEED DIGITAL COPY
00:COPY NEVER    01:COPY THE 1st GENERATION    10:COPY FREELY
THE COPY OF CHILD OBTAINED BY COPYING THE 1st GENERATION COPY IS INHIBITED bit3-2    MagicGateAUTHENTICATION LEVEL
00:Level10(Non-MG)    01:Level1
10:Level2    11:Reserved
CANNOT BE DIVIDED AND COMBINED AT LEVEL OTHER THAN LEVEL 10 bit1,0    Reserved

Fig. 25

| | | | |
|---|---|---|---|
| 0x0370 | PRTSIZE | PRTKEY | Reserved (8) |
| 0x0380 | CONNUM0 | PRTSIZE(0x0388) | PRTKEY |
| 0x0390 | Reserved (8) | | CONNUM0 |

Fig. 26

| | | | | | |
|---|---|---|---|---|---|
| 0x4000 | BLKID-A3D | Reserved | Mcode | CONNUM0 | BLOCK SERIAL |
| 0x4010 | BLOCK SEED | | | INITIALIZATION VECTOR | |
| 0x4020 | SU-000 (Nbyte = 384 byte) | | | | |

Fig. 27

| ANM0 | | 1 | | |
|---|---|---|---|---|
| 1 | 0X0209 | ALBUM NAME 1 | 0X0209 | ARTIST 1 |
| 2 | 0X0000 | 0 | 0X0000 | 0 |
| | | | | |
| 61 | 0X0209 | ALBUM NAME 61 | 0X0209 | ARTIST 61 |
| 62 | 0X0209 | ALBUM NAME 62 | 0X0209 | ARTIST 62 |
| RESERVED | | | | |
| (ALBUM NAME TRACK) | | : | | |
| ANM0 | | 9 | | |
| 497 | 0X0209 | ALBUM NAME 1 | 0X0209 | ARTIST 1 |
| 498 | 0X0000 | 0 | 0X0000 | 0 |
| 499 | | | | |
| 500 | 0X0209 | ALBUM NAME 62 | 0X0209 | ARTIST 62 |
| | | | | |
| | | | | |
| | | | | |
| RESERVED | | | | |
| TNM0 | | 10 | | |
| 1 | 0X0209 | TRACK NAME 1 | 0X0209 | ARTIST 1 |
| 2 | 0X0000 | 0 | 0X0000 | 0 |
| | | | | |
| 61 | 0X0209 | TRACK NAME 61 | 0X0209 | ARTIST 61 |
| 62 | 0X0209 | TRACK NAME 62 | 0X0209 | ARTIST 62 |
| RESERVED | | | | |
| MUSIC PIECE NAME BLOCK | | : | | |
| TNM0 | | 332 | | |
| 19965 | 0X0209 | TRACK NAME 19965 | 0X0209 | ARTIST 19972 |
| 19966 | 0X0000 | 0 | 0X0000 | 0 |
| | | | | |
| 19999 | 0X0209 | TRACK NAME 19999 | 0X0209 | ARTIST 19999 |
| 20000 | 0X0209 | TRACK NAME 20000 | 0X0209 | ARTIST 20000 |
| | | | | |
| | | | | |
| | | | | |
| RESERVED | | | | |

Fig. 28

| BLK-ID | BLOCK SERIAL NO. |
|---------|------------------|
| 4 BYTES | 4 BYTES |

Fig. 29

| ALBUM/MUSIC PIECE FILE NO. | RESERVATION | CHARACTER LANGUAGE CODE | MUSIC PIECE/ ALBUM NAME | CHARACTER LANGUAGE CODE | ARTIST NAME |
|---|---|---|---|---|---|
| 2 BYTES | 2 BYTES | 2 BYTES | 128 BYTES | 2 BYTES | 128 BYTES |

Fig. 30

| TRK0 | 1 | | | |
|---|---|---|---|---|
| 1 | 1 | 10320 | 1 | 1 |
| 2 | 1 | 7740 | 1 | 2 |
| 3 | 2 | 12900 | 2 | 1 |
| 4 | 0 | 0 | 0 | 0 |
| | | | | |
| | | | | |
| 1364 | 0 | 0 | 0 | 0 |
| 1365 | 0 | 0 | 0 | 0 |
| RESERVED | | | | |
| TRK0 | 2 | | | |
| 1366 | 0 | 0 | 0 | 0 |
| | | | | |
| | | | | |
| 2729 | 0 | 0 | 0 | 0 |
| 2730 | 0 | 0 | 0 | 0 |
| RESERVED | | | | |
| BLOCKS 3 ~ 14 | | | | |
| TRK0 | 15 | | | |
| 19111 | 0 | 0 | 0 | 0 |
| | | | | |
| 19999 | 500 | 10320 | 0 | 0 |
| 20000 | 499 | 9030 | 500 | 1 |
| | | | | |
| | | | | |
| | | | | |
| RESERVED | | | | |

Fig. 31

| BLK-ID | BLOCK SERIAL NO. |
|---|---|
| 4 BYTES | 4 BYTES |

Fig. 32

| MUSIC PIECE FILE NO. | ALBUM FILE NO | MUSIC PIECE TOTAL SU | TOCDB IDX | TOC TNO |
|---|---|---|---|---|
| 2 BYTES | 2 BYTES | 4 BYTES | 2 BYTES | 2 BYTES |

| BLK RECORD |
|---|
| ALBUM TOC RECORD |
| ALBUM TOC RECORD |
| ⋮ |
| ALBUM TOC RECORD |
| RESERVED RECORD |

| BLK-ID | BLOCK SERIAL NO. | THE NUMBER OF ALBUMS |
|---|---|---|
| 4 BYTES | 4 BYTES | 4 BYTES |

Fig. 35

| TOC DB IDX | USING STATE | TOC INFORMATION | . . . . . . . | TOC INFORMATION |
|---|---|---|---|---|
| 2 BYTES | 2 BYTES | 4 BYTES | . . . . . . . | 4 BYTES |

Fig. 36

| Trk No. | AMIN | ASEC | AFRAME |
|---|---|---|---|
| 1 BYTE | 1 BYTE | 1 BYTE | 1 BYTE |

Fig. 39

| ALBUM NO. | THE NUMBER OF TRACKS |
|---|---|
| Album 1 | 12Tr |
| Album 3 | 5Tr |
| Album 23 | 33Tr |
| Album 47 | 128Tr |
| Album 101 | 14Tr |
| Album 256 | 10Tr |
| Album 384 | 9Tr |
| Album 444 | 13Tr |
| Album 500 | 18Tr |

Fig. 40

| PLAY LIST NO. | TRACK NO. | LINK DESTINATION |
|---|---|---|
| P.List 501 | 1 | Album 23   Tr18 |
|  | 2 | Album 256  Tr3 |
| P.List 502 | 1 | Album 23   Tr18 |
|  | 2 | Album 256  Tr3 |
|  | 3 | Album 1    Tr1 |
|  | 4 | Album 3    Tr4 |
|  | 5 | Album 384  Tr2 |
| P.List 505 | 1 | Album 101  Tr14 |
|  | 2 | Album 47   Tr128 |
|  | 3 | Album 23   Tr11 |
| P.List 510 | 1 | Album 1    Tr1 |
|  | 2 | Album 3    Tr2 |
|  | 3 | Album 23   Tr3 |
|  | 4 | Album 47   Tr4 |
|  | 5 | Album 101  Tr14 |
|  | 6 | Album 256  Tr6 |
|  | 7 | Album 384  Tr7 |

Fig. 42

| PLAY LIST NO. | TRACK NO. | LINK DESTINATION |
|---|---|---|
| P.List 501 | 1 | Album 23   Tr18 |
|  | 2 | Album 256  Tr3 |
| P.List 502 | 1 | Album 23   Tr18 |
|  | 2 | Album 256  Tr3 |
|  | 3 | Album 1    Tr1 |
|  | 4 | Album 384  Tr2 |
| P.List 505 | 1 | Album 101  Tr14 |
|  | 2 | Album 47   Tr128 |
|  | 3 | Album 23   Tr11 |
| P.List 510 | 1 | Album 1    Tr1 |
|  | 2 | Album 3    Tr2 |
|  | 3 | Album 23   Tr3 |
|  | 4 | Album 47   Tr4 |
|  | 5 | Album 101  Tr14 |
|  | 6 | Album 256  Tr6 |
|  | 7 | Album 384  Tr7 |

Fig. 44

| PLAY LIST NO. | TRACK NO. | LINK DESTINATION |
|---|---|---|
| P.List 501 | 1 | Album 256  Tr3 |
| P.List 502 | 1 | Album 256  Tr3 |
|  | 2 | Album 1    Tr1 |
|  | 3 | Album 3    Tr4 |
|  | 4 | Album 384  Tr2 |
| P.List 505 | 1 | Album 101  Tr14 |
|  | 2 | Album 47   Tr128 |
|  | 3 | Album 23   Tr11 |
| P.List 510 | 1 | Album 1    Tr1 |
|  | 2 | Album 3    Tr2 |
|  | 3 | Album 23   Tr3 |
|  | 4 | Album 47   Tr4 |
|  | 5 | Album 101  Tr14 |
|  | 6 | Album 256  Tr6 |
|  | 7 | Album 384  Tr7 |

Fig. 46

| PLAY LIST NO. | TRACK NO. | LINK DESTINATION |
|---|---|---|
| P.List 501 | 1 | Album 23   Tr18 |
|  | 2 | Album 256  Tr3 |
| P.List 502 | 1 | Album 23   Tr18 |
|  | 2 | Album 256  Tr3 |
|  | 3 | Album 3    Tr4 |
|  | 4 | Album 384  Tr2 |
| P.List 505 | 1 | Album 101  Tr14 |
|  | 2 | Album 47   Tr128 |
|  | 3 | Album 23   Tr11 |
| P.List 510 | 1 | Album 3    Tr2 |
|  | 2 | Album 23   Tr3 |
|  | 3 | Album 47   Tr4 |
|  | 4 | Album 101  Tr14 |
|  | 5 | Album 256  Tr6 |
|  | 6 | Album 384  Tr7 |

Fig. 48

| PLAY LIST NO. | TRACK NO. | LINK DESTINATION |
|---|---|---|
| P.List 501 | 1 | Album 23  Tr18 |
|  | 2 | Album 256  Tr3 |
| P.List 502 | 1 | Album 23  Tr18 |
|  | 2 | Album 256  Tr3 |
|  | 3 | Album 1  Tr1 |
|  | 4 | Album 3  Tr4 |
|  | 5 | Album 384  Tr2 |
| P.List 505 | 1 | Album 101  Tr14 |
|  | 2 | Album 23  Tr11 |
| P.List 510 | 1 | Album 1  Tr1 |
|  | 2 | Album 3  Tr2 |
|  | 3 | Album 23  Tr3 |
|  | 4 | Album 101  Tr14 |
|  | 5 | Album 256  Tr6 |
|  | 6 | Album 384  Tr7 |

EDITING APPARATUS AND METHOD CAPABLE OF ERASING A PREDETERMINED PROGRAM ON A SELECTED PLAY-LIST

TECHNICAL FIELD

The invention relates to an editing apparatus and an editing method and, more particularly, to an editing apparatus and an editing method for editing a program recorded on a recording medium.

BACKGROUND ART

Hitherto, a recording medium which is used in an audio apparatus generally has a capacity for recording audio data of about 80 minutes. However, in association with the realization of a large capacity of the recent recording media, audio data of time that is much longer than before can be stored into the recording medium. Since the recording media of a large capacity have also become less expensive, the user can reasonably obtain the recording media of a large capacity. Among the large capacity recording media, a hard disk drive (hereinafter, referred to as HDD) as a representative of them is a media which is drawing the largest attention in recent years in view of a size of capacity and price.

In the HDD, since a much larger number of music pieces than those of the conventional recording media can be stored and held, functions of the audio apparatus itself have also been changed largely from the conventional ones. For example, a play list function can be mentioned as a new function. The play list function is a function such that by selecting only desired music pieces from a music file (track) recorded on a hard disk and registering them into a file called a play list, a virtual album in which only the desired music pieces of the user are collected can be formed. That is, it is a function such that a program reproducing function equipped for a conventional CD reproducing apparatus is expanded.

However, the conventional play list function has a problem such that if the track registered in the play list is divided, combined, or erased, the music pieces registered in the play list cannot be reproduced. This problem is caused because when the track as a substance is edited, information of the track registered in the play list is not updated.

According to the conventional play list function, there is also a problem such that a possibility that an editing operation such as division, combination, erasure, or the like is erroneously executed to the track registered in the play list is high.

It is, therefore, an object of the invention to provide an editing apparatus and an editing method, in which when a track as a substance is edited, track information corresponding to the track can be erased from a play list.

Another object of the invention is to provide an editing apparatus and an editing method, in which it is possible to prevent a track registered in a play list from being erroneously edited.

DISCLOSURE OF INVENTION

To solve the above problems, according to the invention of claim 1, there is provided an editing apparatus for editing a program recorded on a recording medium having a program area in which a plurality of programs have been recorded and a management area in which first management information for collecting the plurality of programs recorded in the program area into groups and managing every group and second management information for collecting desired programs from the plurality of programs recorded in the program area and grouping the collected programs have been recorded, comprising:

operating means for instructing erasure to a predetermined program belonging to a predetermined group recorded in the program area;

discriminating means for discriminating whether the predetermined program whose erasure has been instructed by the operating means has been managed by the second management information or not; and notifying means for, if it is determined by the discriminating means that the predetermined program whose erasure has been instructed by the operating means has been managed by the second management information, warning before an erasing operation is executed.

According to the invention of claim 5, there is provided an editing method of editing a program recorded on a recording medium having a program area in which a plurality of programs have been recorded and a management area in which first management information for collecting the plurality of programs recorded in the program area into groups and managing every group and second management information for collecting desired programs from the plurality of programs recorded in the program area and grouping the collected programs have been recorded, comprising:

a first discriminating step of discriminating whether erasure has been instructed to a predetermined program belonging to a predetermined group recorded in the program area or not;

second discriminating means for, if it is determined in the first discriminating step that the erasure has been instructed, discriminating whether the predetermined program whose erasure was instructed has been managed by the second management information or not; and a notifying step of, if it is determined by the second discriminating means that the predetermined program whose erasure was instructed has been managed by the second management information, warning before an erasing operation is executed.

According to the invention of claim 9, there is provided an editing apparatus for editing a program recorded on a recording medium having a program area in which a plurality of programs have been recorded and a management area in which first management information for collecting the plurality of programs recorded in the program area into groups and managing every group and second management information for collecting desired programs from the plurality of programs recorded in the program area and grouping the collected programs have been recorded, comprising:

operating means for instructing editing to a predetermined program belonging to a predetermined group recorded in the program area;

discriminating means for discriminating whether the predetermined program whose editing has been instructed by the operating means has been managed by the second management information or not; and notifying means for, if it is determined by the discriminating means that the predetermined program whose editing has been instructed by the operating means has been managed by the second management information, warning before an editing operation is executed.

According to the invention of claim 18, there is provided an editing method of editing a program recorded on a recording medium having a program area in which a plurality of programs have been recorded and a management area in which first management information for collecting the plurality of programs recorded in the program area into groups and managing every group and second management information for collecting desired programs from the plurality of programs recorded in the program area and grouping the collected programs have been recorded, comprising:

a first discriminating step of discriminating whether editing has been instructed to a predetermined program belonging to a predetermined group recorded in the program area or not;

second discriminating means for, if it is determined in the first discriminating step that the editing has been instructed, discriminating whether the predetermined program whose editing was instructed has been managed by the second management information or not; and a notifying step of, if it is determined by the second discriminating means that the predetermined program whose editing was instructed has been managed by the second management information, warning before an editing operation is executed.

According to the invention of claims 1 and 5, the editing apparatus discriminates whether the management information of the predetermined program whose erasure was instructed has been managed in the management area or not, and if it is determined that the management information has been managed in the management area, the user is warned that the predetermined program whose erasure was instructed has been managed in the management area before the predetermined program is erased. Therefore, the user can confirm whether the predetermined program whose erasure was instructed has been registered in the management area or not.

According to the invention of claims 9 and 18, the editing apparatus discriminates whether the management information of the predetermined program whose editing was instructed has been managed in the management area or not, and if it is determined that the management information has been managed in the management area, the user is warned that the predetermined program whose editing was instructed has been managed in the management area before the predetermined program is edited. Therefore, the user can confirm whether the predetermined program whose editing was instructed has been registered in the management area or not.

BRIEF DESCRIPTION OF DRAWINGS

FIG. 13 is a data structure diagram of an album number management file.

FIG. 14A is a structure diagram of a header portion of the album number management file.

FIG. 14B is a structure diagram of portions other than the header portion of the album number management file.

FIG. 18 is a data structure diagram of the album reproduction management file Pbxxxxxx.msf.

FIG. 19A shows a structure diagram of a header portion of the album reproduction management file Pbxxxxxx.msf.

FIG. 19B shows a structure diagram of portions other than the header portion of the album reproduction management file Pbxxxxxx.msf.

FIG. 19C shows a structure diagram of additional information data of the album reproduction management file Pbxxxxxx.msf.

FIG. 20 is a detailed data structure diagram of the ATRAC3 data file.

FIG. 21 is a data structure diagram of an upper stage of an attribute header constructing the ATRAC3 data file.

FIG. 22 is a data structure diagram of a middle stage of the attribute header constructing the ATRAC3 data file.

FIG. 23 is a table showing kinds of recording modes, a recording time in each recording mode, and the like.

FIG. 24 is a table showing a copy control state.

FIG. 25 is a data structure diagram of a lower stage of the attribute header constructing the ATRAC3 data file.

FIG. 26 is a data structure diagram of a header of a data block of the ATRAC3 data file.

FIG. 27 is a structure diagram of an album track name database file Namedb.msf.

FIG. 28 is a diagram showing a block ID portion of the album track name database file Namedb.msf.

FIG. 29 is a diagram showing a name record portion of the album track name database file Namedb.msf.

FIG. 30 is a structure diagram of a reproduction time management database file Playtime.msf.

FIG. 31 shows a block ID portion of there production time management database file Playtime.msf.

FIG. 32 shows a TRK record portion of the reproduction time management database file Playtime. msf.

FIG. 35 shows an ALBUM TOC record of the CD TOC database file Tocdb.msf.

FIG. 36 shows TOC information of an ALBUM TOC record of the CD TOC database file Tocdb.msf.

FIG. 39 is a table showing the number of each album stored in the HD recording and reproducing apparatus and the number of tracks included in each album before an editing process.

FIG. 40 is a table showing the number of each album stored in the HD recording and reproducing apparatus and the number of tracks included in each album before the editing process.

FIG. 42 is a table showing the number of each album stored in the HD recording and reproducing apparatus and the number of tracks included in each album after the editing process.

FIG. 44 is a table showing the number of each album stored in the HD recording and reproducing apparatus and the number of tracks included in each album after the editing process.

FIG. 46 is a table showing the number of each album stored in the HD recording and reproducing apparatus and the number of tracks included in each album after the editing process.

FIG. 48 is a table showing the number of each album stored in the HD recording and reproducing apparatus and the number of tracks included in each album after the editing process.

BEST MODE FOR CARRYING OUT THE INVENTION

Figure 1:
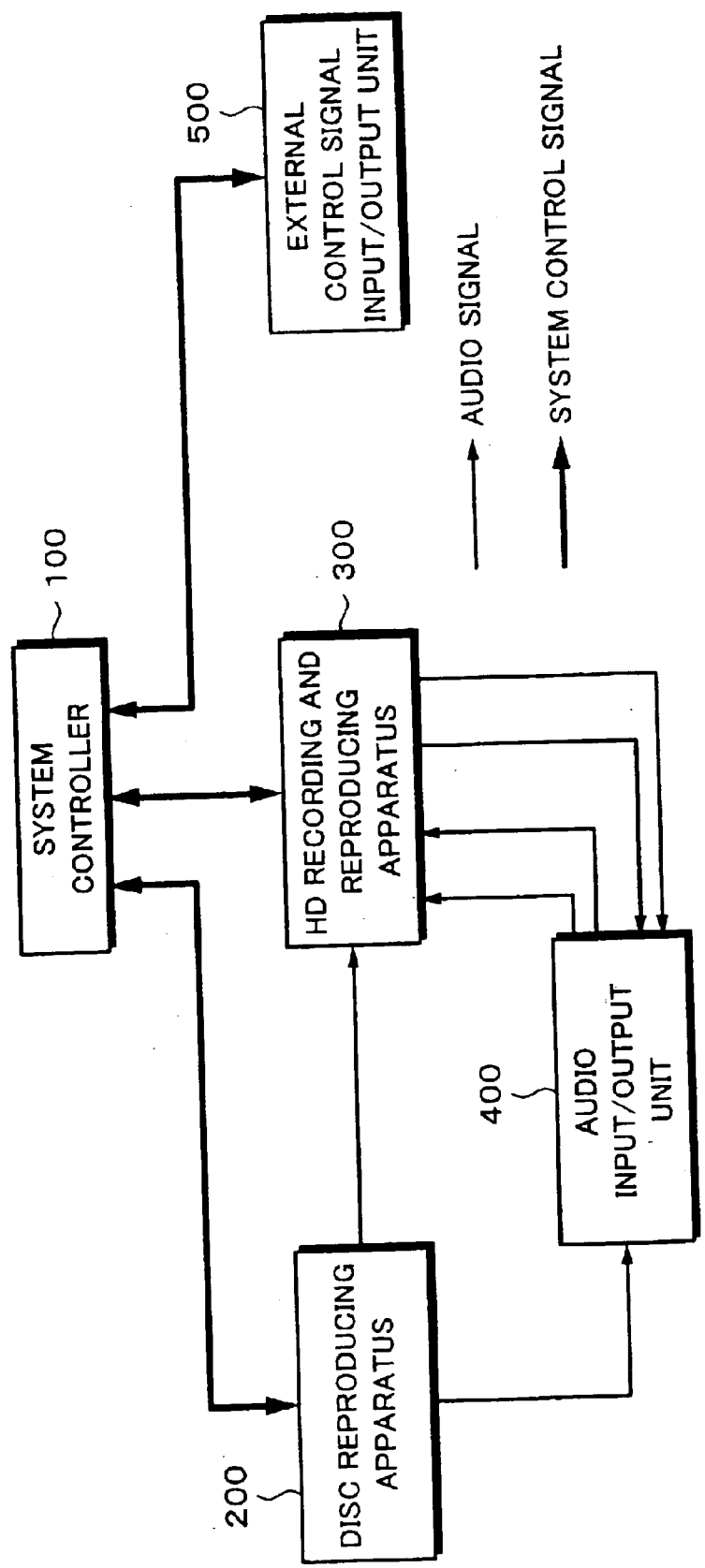
FIG. 1 is a block diagram showing an example of a construction of a dubbing apparatus according to an embodiment of the invention.

An embodiment of the invention will be described herein below with reference to the drawings. FIG. 1 is a block diagram showing an example of a construction of a dubbing apparatus according to the embodiment of the invention. As shown in FIG. 1, the dubbing apparatus according to the embodiment of the invention is constructed by a system controller 100, a disc reproducing apparatus 200, an HD recording and reproducing apparatus 300, an audio input/output unit 400, and an external control signal input/output unit 500.

An audio signal which is transmitted and received among the disc reproducing apparatus 200, the HD recording and reproducing apparatus 300, and the audio input/output unit 400 is an audio signal according to a digital audio interface of, for example, IEC60958. However, since the audio input/output unit 400 has an analog input terminal, which will be explained herein later, the audio signal inputted as an analog signal to the analog input terminal of the audio input/output unit 400 is converted into a digital signal by an A/D converter, which will be explained herein later. A serial signal synchronized with an LR clock and a bit clock is supplied to the HD recording and reproducing apparatus 300.

Figure 2:
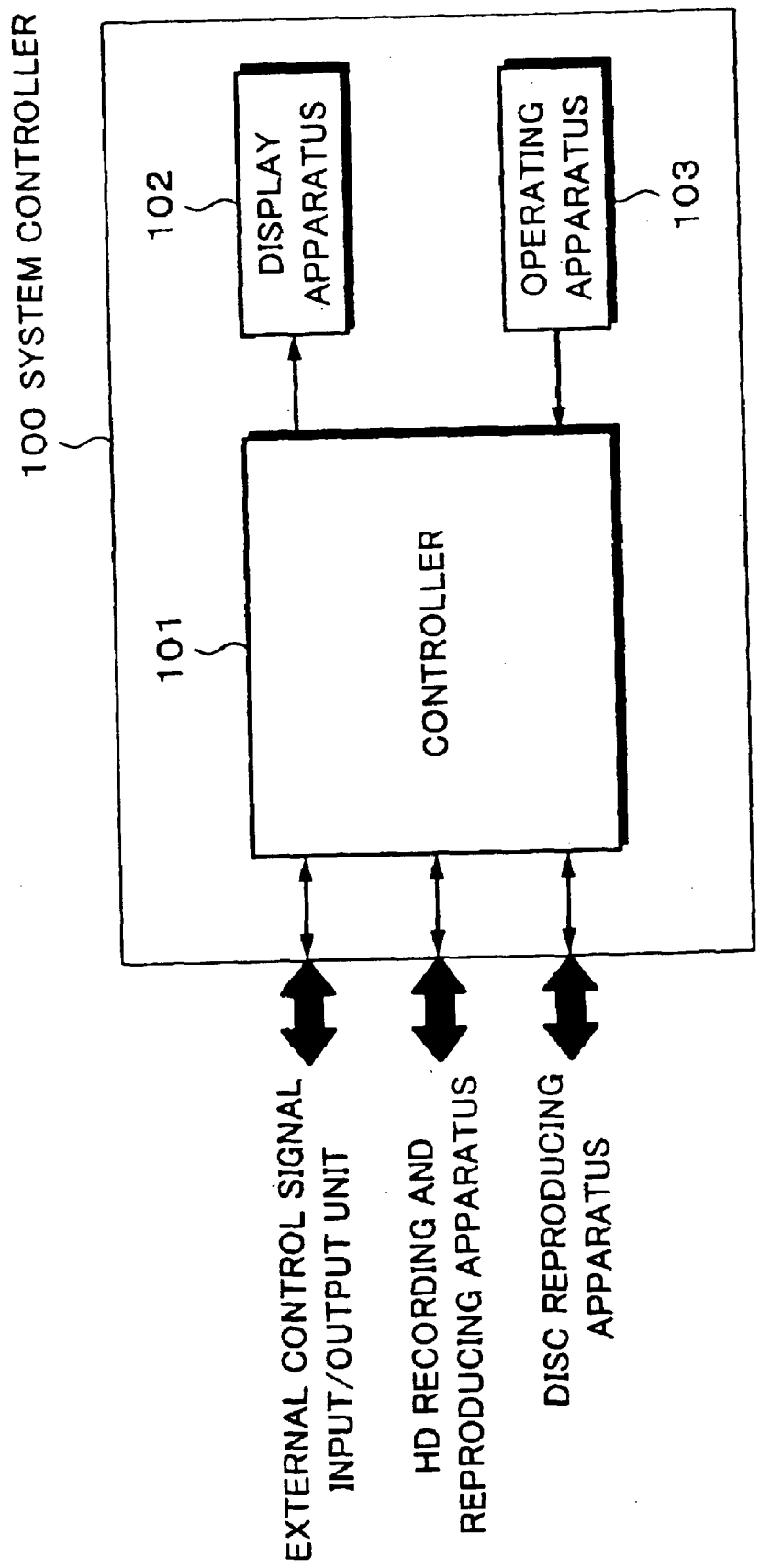
FIG. 2 is a block diagram showing an example of a construction of a system controller 100 according to the embodiment of the invention.

FIG. 2 is a block diagram showing an example of a construction of the system controller 100 according to the embodiment of the invention. As shown in FIG. 2, the system controller 100 is constructed by a controller 101, a display apparatus 102, and an operating apparatus 103. The controller 101 controls each block provided for the dubbing apparatus by using a system control signal.

The display apparatus 102 is a display apparatus constructed by, for example, a liquid crystal display, an FL tube, or the like. The display apparatus 102 is connected to the controller 101 and displays on the basis of a signal which is supplied from the controller 101. For example, the display apparatus 102 displays information such as track number, reproduction time, and the like on the basis of a signal which is supplied from the controller 101.

The operating apparatus 103 is used for operating the dubbing apparatus. Specifically speaking, the operating apparatus 103 has a power key, a play key, a pause key, a stop key, a record key, a synchronous record key, a play list register key, a menu key, a jog key, and the like.

The power key is used for turning on or off a power source of the dubbing apparatus. The play key is used for starting reproduction of an optical disc loaded into the disc reproducing apparatus 200 or a music file recorded in the HD recording and reproducing apparatus. The pause key is used for temporarily stopping the recording or reproduction of the optical disc loaded into the disc reproducing apparatus 200 or the file recorded in the HD recording and reproducing apparatus. The stop key is used for stopping the recording or reproduction of the optical disc loaded into the disc reproducing apparatus 200 or the music file recorded in the HD recording and reproducing apparatus. The record key is used for starting the recording of data into the HD recording and reproducing apparatus.

The synchronous record key is a key for executing synchronous recording. The synchronous recording is a recording method of automatically starting or stopping the recording in accordance with the reproducing side. Specifically speaking, when the synchronous record key is pressed, the recording of the HD recording and reproducing apparatus 300 is also started synchronously with the reproduction of the disc reproducing apparatus 200. The recording of the HD recording and reproducing apparatus 300 is also stopped synchronously with the stop of the reproduction of the disc reproducing apparatus 200. Therefore, the user can easily store the data reproduced by the disc reproducing apparatus 200 into the HD recording and reproducing apparatus 300 without operating the disc reproducing apparatus 200 and the HD recording and reproducing apparatus 300, respectively. The menu key is used for displaying a menu of the editing operation or the like to the display apparatus 102. The play list register key is used for starting the registration of music pieces into the play list.

The jog key has a structure such that it can be pressed and rotated. Specifically speaking, stop positions are provided intermittently, for example, ten times per rotation and data is updated at every stop position. For example, when the jog key is rotated to the right, a numerical value selected in the display apparatus 102 is updated in a (+) direction and, when the jog key is rotated to the left, the numerical value selected in the display apparatus 102 is updated in a (−) direction. The reproduction, pause, stop, recording, synchronous recording, menu selection, or the like can be also executed only by the operation of this jog key.

Figure 3:
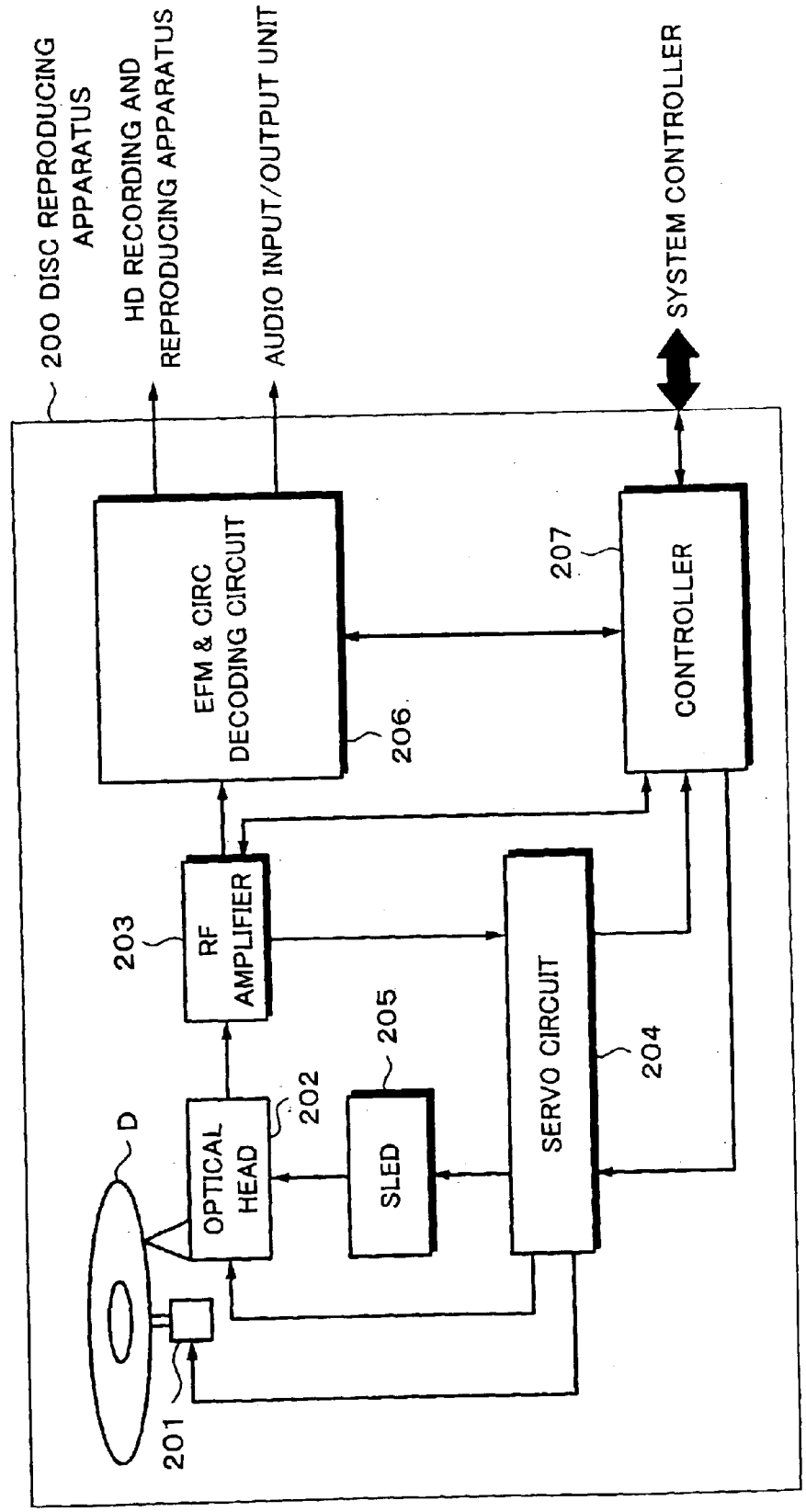
FIG. 3 is a block diagram showing an example of a construction of a disc reproducing apparatus 200 according to the embodiment of the invention.

FIG. 3 is a block diagram showing an example of a construction of the disc reproducing apparatus 200 according to the embodiment of the invention. As shown in FIG. 3, the disc reproducing apparatus 200 is constructed by a spindle motor 201, an optical head 202, an RF (Radio Frequency) amplifier 203, a servo circuit 204, a sled 205, an EFM (Eight to Fourteen Modulation) and CIRC (Cross Interleave Reed-Solomon Code) decoding circuit 206, and a controller 207. An optical disc D used here is, for example, a compact disc.

The optical disc D loaded into the disc reproducing apparatus 200 is rotated at a CLV (Constant linear Velocity) by the spindle motor 201 at the time of the CD reproducing operation.

By irradiating a laser beam onto a recording surface of the optical disc D and receiving the reflected light, the optical head 202 reads out data recorded in a pit format on the optical disc D and supplies it to the RF amplifier 203. Intensity of the laser beam is optimized by an APC (Automatic Power Control) (not shown). The optical head 202 can be deviated in the tracking and focusing directions. The optical head 202 can be moved in the radial direction of the optical disc D on the basis of a signal which is supplied from the sled 205.

The RF amplifier 203 forms a reproduction RF signal, a focusing error signal, and a tracking error signal on the basis of the signal supplied from the optical head 202. The focusing error signal and the tracking error signal are supplied to the servo circuit 204. The reproduction RF signal is supplied to the EFM and CIRC decoding circuit 206.

The servo circuit 204 forms various drive signals such as focusing drive signal, tracking drive signal, sled drive signal, and spindle drive signal on the basis of the focusing error signal and the tracking error signal supplied from the RF amplifier 203. On the basis of those signals, the operations of the sled 205 and the spindle motor 201 are controlled.

The EFM and CIRC decoding circuit 206 binarizes the reproduction RF signal supplied from the RF amplifier, thereby obtaining an EFM signal. By executing EFM demodulation, CIRC decoding, or the like to the EFM signal, the information read out from the optical disc is decoded into a digital format of 16-bit (Binary digiT(bit)) quantization and 44.1 kHz sampling and supplied to the audio input/output unit 400. The CIRC decoding used here denotes an error detecting and error correcting process using CIRC and, specifically speaking, it is an error detecting and error correcting process using C1 and C2 codes.

The EFM and CIRC decoding circuit 206 extracts control data such as TOC (Table Of Contents), subcode, and the like, which will be explained herein later, from the reproduction RF signal supplied from the RF amplifier 203 and supplies those control data to the controller 207.

The controller 207 controls each unit on the basis of data such as TOC, subcode, and the like which is supplied from the EFM and CIRC decoding circuit 206. The controller 207 transmits the control data such as TOC, subcode, and the like to the system controller 100. Further, the controller 207 receives a system control signal from the system controller 100 and controls each unit provided for the disc reproducing apparatus 200 on the basis of the system control signal.

Figure 4:
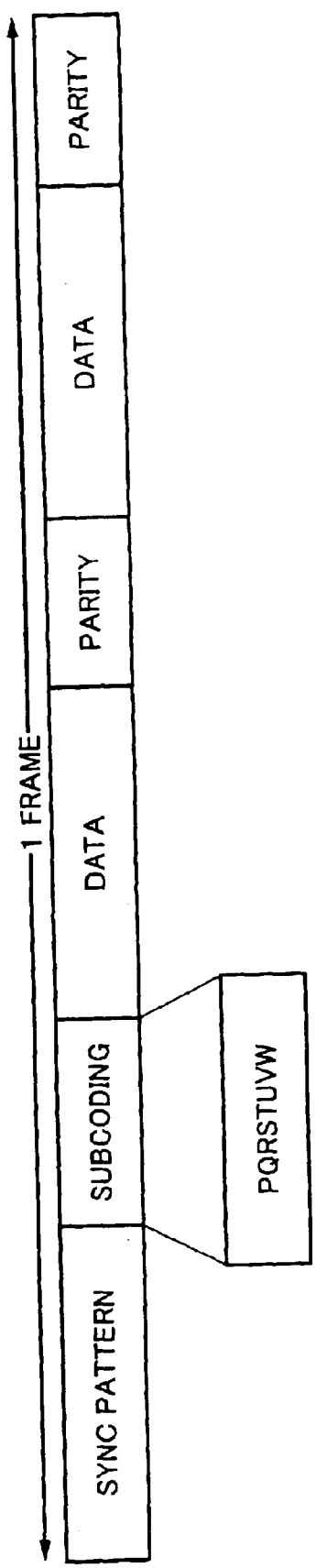
FIG. 4 is a schematic diagram showing an example of a construction of a frame in a CD.

FIG. 4 shows a frame construction of the data which is formed by the EFM and CIRC decoding circuit 206 shown in FIG. 3 and supplied to the controller 207. As shown in FIG. 4, one frame comprises: a sync pattern portion (24 channel bits); a subcoding portion (1 symbol; that is, 14 channel bits); a first data portion (12 symbols; that is, 12×14 channel bits); a first parity portion (4 symbols; that is, 4×14 channel bits); a second data portion (12 symbols; that is, 12×14 channel bits); and a second parity portion (4 symbols; that is, 4×14 channel bits). Although not shown, coupling bits of 3 bits are included in the frame in order to couple each symbol (a sync pattern is also regarded as a symbol consisting of 24 bits). The total number of bits of the coupling bits is equal to 34×3=102 channel bits. Therefore, one frame consists of a total of 588 channel bits.

Figures 5, 6:
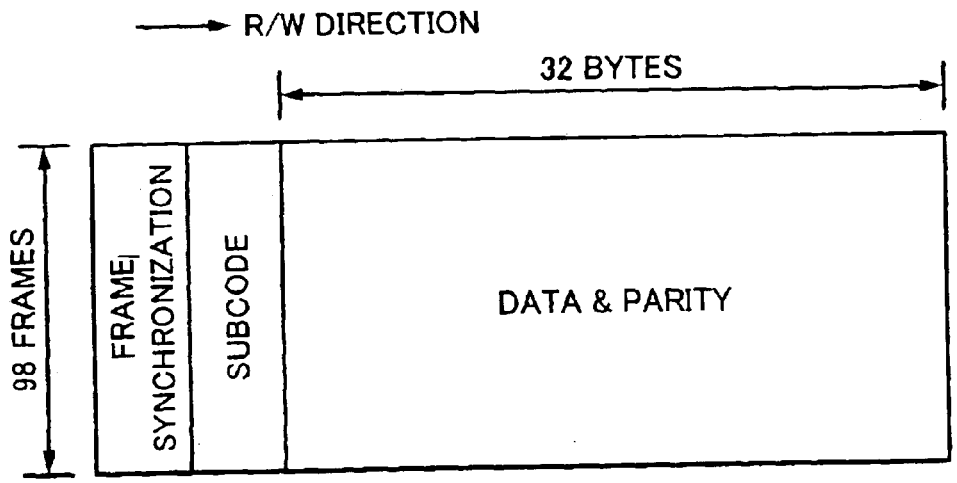
FIG. 5 is a schematic diagram showing an example of a construction of a format of a subcode in the CD.
FIG. 6 is a schematic diagram showing an example of a construction of a subcode frame in the CD.

As shown in FIG. 5, 98 frames form a bundle of information (subcode frame) comprising frame sync information, subcode information, data, and parity information. The subcode data in the 98 frames expresses, as one block, the subcode information. Such a block will be described with reference to FIG. 6. A subcode of a first frame F1 consists of a fixed sync pattern S0=00100000000001. A subcode of a second frame F2 consists of a fixed sync pattern S1=00000000010010. Since a pattern which does not appear in the EFM modulation is used as S0 and S1, a start position of the block regarding the subcode information is specified upon reproduction.

Subcodes of 96 frames of a third frame F3, a fourth frame F4, . . . , a 97th frame F97, and a 98th frame F98 comprise (P1, Q1, R1, S1, T1, U1, V1, and W1), (P2 to W2), . . . , (P95 to W95), and (P96 to W96), respectively. Each of (P1, P2, . . . , and P96), (Q1, Q2, . . . , and Q96), (R1 to R96), (S1 to S96), (T1 to T96), (U1 to U96), (V1 to V96), and (W1 to W96) forms a completed information channel.

(1) information regarding a head search of music pieces and a program function such that the music pieces are reproduced in preset order, (2) additional information such as text information, and the like are included in those subcode information. A P channel and a Q channel of the subcode are used as information of (1). R to W channels of the subcode are used as information of (2). The P channel indicates a pause between music pieces and is information which is used for the rough head search. The Q channel is information for more detailed control.

Figure 7:
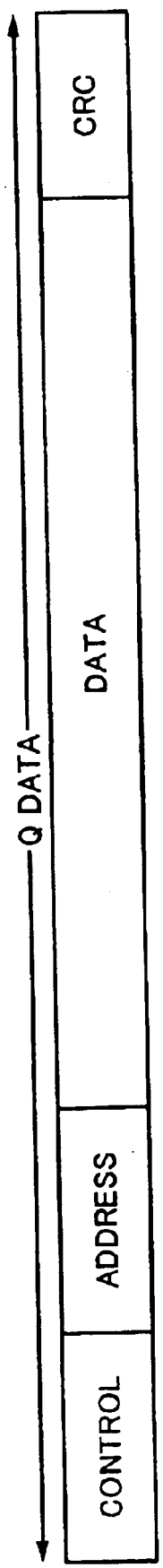
FIG. 7 is a schematic diagram showing an example of a construction of Q data in the subcode.
Figure 8:
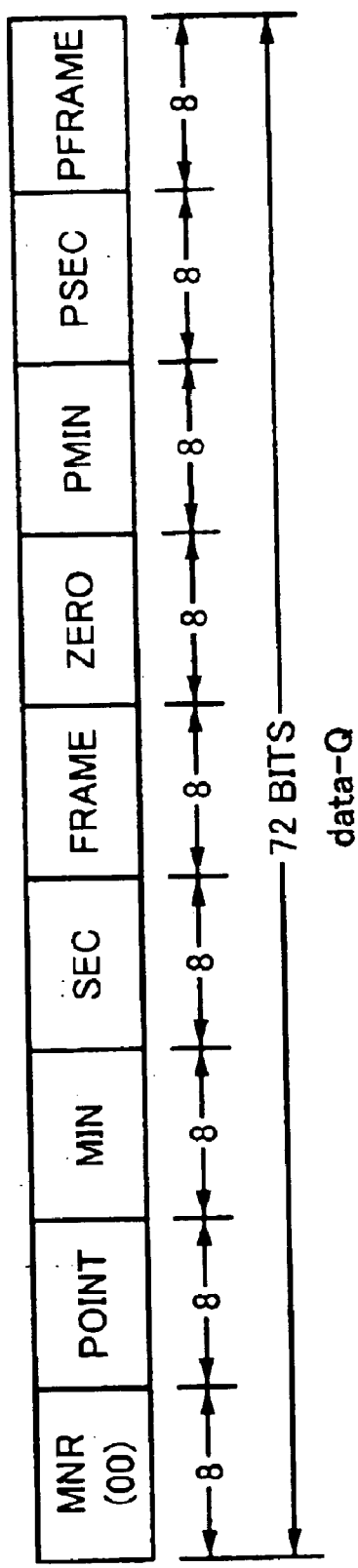
FIG. 8 is a schematic diagram showing an example of a construction of a data portion in the Q data.

FIG. 7 shows an example of contents of the Q data. As shown in FIG. 8, the Q data comprises a control portion, an address portion, a data portion, and a CRC (Cyclic Redundancy Code) portion.

The control portion consists of 4 bits of Q1 to Q4. Data indicative of the number of audio channels and data for identifying emphasis, digital data, and the like have been recorded therein.

The address portion consists of 4 bits of Q5 to Q8. A control signal showing a format and a kind of data in the data portion, which will be explained herein later, has been recorded therein.

The CRC portion consists of 16 bits of Q81 to Q96. Data for performing error detection of a cyclic code has been recorded therein.

Figure 9:
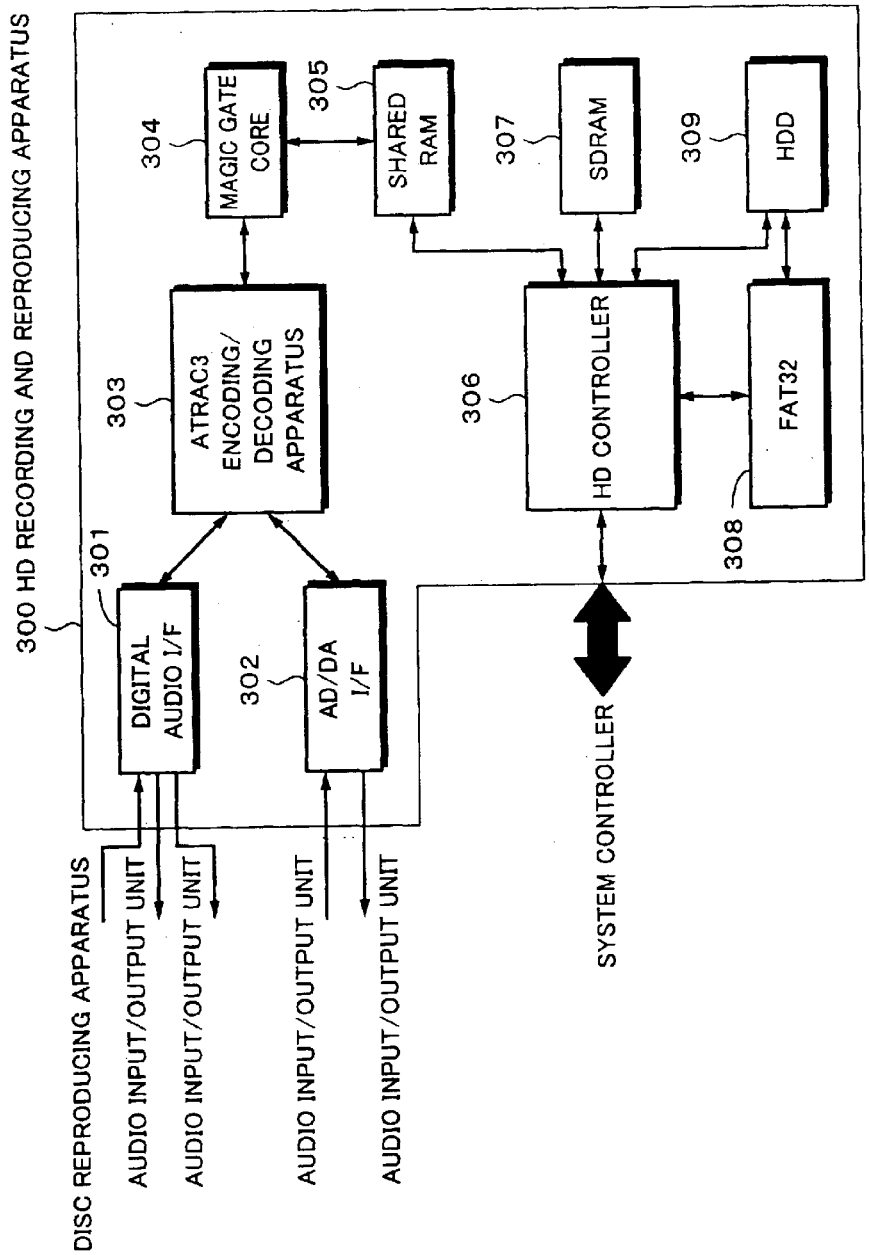
FIG. 9 is a block diagram showing an example of a construction of an HD recording and reproducing apparatus according to the embodiment of the invention.

As shown in FIG. 8, the data portion consists of data of 72 bits of Q9 to Q80. If the data of 4 bits in the address portion is equal to "0001", the data portion (TOC (Table Of Contents)) in a lead-in area of the optical disc D has a structure shown in FIG. 9. That is, as shown in FIG. 9, the data portion comprises: an MNR portion (music piece number portion); a POINT portion (point portion); an MIN portion (elapsed time minute component portion); an SEC portion (elapsed time second component portion); an FRAME portion (elapsed time frame number portion); a ZERO portion (zero portion); a PMIN portion (absolute time minute component portion); a PSEC portion (absolute time second component portion); and a PFRAME portion (absolute time frame number portion). Each of those portions consists of data of 8 bits.

Each of the MNR portion, MIN portion, SEC portion, FRAME portion, and ZERO portion is fixed to "00" as a hexadecimal notation and is constructed by allocating "0" to all of 8 bits.

If the POINT portion is equal to "A0" as a hexadecimal notation, the PMIN portion indicates the number of the first music piece or movement. If the POINT portion is equal to "A1" as a hexadecimal notation, the PMIN portion indicates the number of the last music piece or movement. If the POINT portion is equal to "A2" as a hexadecimal notation, each of the PMIN portion (absolute time minute component portion), the PSEC portion (absolute time second component portion), and the PFRAME portion (absolute time frame number portion) indicates absolute time (PTIME) at which a lead-out area starts.

Further, if the POINT portion is expressed by BCD of 2 digits, each of the PMIN portion (absolute time minute component portion), the PSEC portion (absolute time second component portion), and the PFRAME portion (absolute time frame number portion) indicates absolute time (PTIME) by which an address where each music piece or movement shown by its numerical value starts is shown.

Although the case where the disc reproducing apparatus 200 is a disc reproducing apparatus in which one optical disc can be loaded has been shown as an example here, the disc reproducing apparatus 200 can be also replaced with a reproducing apparatus of a disc changer type in which a plurality of optical discs can be loaded.

FIG. 9 is a block diagram showing an example of a construction of the HD recording and reproducing apparatus 300 according to the embodiment of the invention. The HD recording and reproducing apparatus 300 is an apparatus for recording and reproducing audio data and recording data for managing the audio data, and the like.

As shown in FIG. 9, the HD recording and reproducing apparatus 300 is constructed by: a digital audio interface (hereinafter, referred to as a digital audio I/F) 301; an AD/DA interface (hereinafter, referred to as an AD/DA I/F) 302; an encoding/decoding apparatus 303; a magic gate core (Magic Gate Core) unit. 304; a shared RAM (Random Access Memory) 305; an HD controller 306; an SDRAM (Synchronous Dynamic Random Access Memory) 307; an FAT (File Allocation Table) file system 308; and an HDD (Hard Disk Drive 309).

The digital audio I/F 301 is an interface for a digital audio signal and transmits the digital audio signal supplied from the EFM and CIRC decoding circuit 206 provided for the disc reproducing apparatus 200 or from a digital input terminal (which will be explained hereinlater) equipped for the audio input/output unit 400 to the encoding/decoding apparatus 303. The digital audio I/F 301 also transmits the digital signal supplied from the encoding/decoding apparatus 303 to a digital output terminal (which will be explained hereinlater) equipped for the audio input/output unit 400.

The AD/DA I/F 302 transmits the digital audio signal supplied from an A/D converting unit (which will be explained hereinafter) equipped for the audio input/output unit 400 to the encoding/decoding apparatus 303. The AD/DA I/F 302 transmits the digital audio signal supplied from the encoding/decoding apparatus 303 to a D/A converter 402 equipped for the audio input/output unit 400.

The encoding/decoding apparatus 303 compresses the digital audio signal supplied from the digital audio I/F 301 or the AD/DA I/F 302 by ATRAC3 (Adaptive Transform Acoustic Cording 3) and transmits it to the magic gate core unit 304. A compression system of the data is not limited to ATRAC3 but it is also possible to use a compression system such as MP3 (MPEG-1 audio layer 3), WMA (Windows (registered trademark) Media Audio), AAC (Advanced Audio Cording), TwinVQ (Transform-domain Weighted Interleave Vector Quantization), or the like.

The audio compression encoding/decoding apparatus 303 decompresses the data which has been supplied from the magic gate core unit 304 and compressed by ATRAC3 and transmits it to the digital interface 301 and/or the AD/DA I/F 302.

The magic gate core unit 304 encrypts the audio data supplied from the encoding/decoding apparatus 303 and supplies it to the shared RAM 305. "MAGIC GATE" is a function for executing encryption of contents (music) and mutual authentication between equipment for the purpose of protecting a copyright.

The shared RAM 305 stores the digital audio data supplied from the magic gate core unit 304 and transmits it to the HD controller 306. The shared RAM 305 stores the digital audio data supplied from the HD controller 306 and transmits it to the magic gate core unit 304.

The HD controller 306 is a microcomputer. Each unit of the HD recording and reproducing apparatus 300 is controlled by the microcomputer. For example, the HD controller 306 controls the start of the ATRAC3 encoding or the start of the ATRAC3 decoding for the ATRAC3 encoding/decoding apparatus 303. The HD controller 306 also controls the start of the encryption or the start of the decryption for the magic gate core unit (5-4). The HD controller 306 and the HDD 309 are connected by, for example, an IDE (Integrated Device (Drive) Electronics) bus according to ATA (ATAttachment). The writing and reading operations of the data via this bus are executed by data transfer using a PIO (Programmable I/O) mode.

Interruption from the shared RAM 305 occurs in the HD controller 306 each time encryption of one sound unit (about 23.2 msec) is finished in the magic gate core unit 304. Each time the interruption occurs, the HD controller 306 transfers data held in the shared RAM 305 to the SDRAM 307, further, transfers it to the HDD 309 via the FAT32 file system (308), and records music as files onto the HDD 309.

Interruption from the shared RAM 305 occurs in the HD controller 306 each time decryption of one sound unit is finished in the magic gate core unit 304. Each time the interruption occurs, the HD controller 306 transfers a next sound unit from the SDRAM 307 to the shared RAM.

The SDRAM 307 stores the audio digital data supplied from the HDD 309 or the shared RAM 305.

The FAT32 file system 308 is a file system which is used when the HD controller 306 reads out the data from the HDD 309 and writes the data onto the HDD 309. The FAT32 file system 308 is indispensable to manage the data written on the HDD 309 every file. Although the FAT32 file system 308 is shown here by the block for convenience of explanation, the FAT32 file system 308 is software built in the HD controller 306 and is not a physical system as shown in another block. Although the FAT32 file system is used as a file system in the embodiment of the invention, a VFAT32 file system can be also used as a file system. An NTFS (NT File System), an HFS (Hierarchical File System), an HFS Plus, or the like can be also used as a file system.

All of the data which is recorded onto the HDD 309 is files which are managed by the FAT32 file system 308. Audio data and a database for music management information, which will be explained hereinlater, are also files which are managed by the FAT32 file system 308. System calls for opening, closing, reading, writing, etc. of the files which are necessary for the file operation are provided for the FAT32 file system 308.

The HDD 309 stores the audio data and the like. Specifically speaking, the HDD 309 stores an album number management file, a reproduction time management database file, an album/track name database file, a TOC database file, an album reproduction management file, a music file, a play list management file, and the like. Details of those files will be explained hereinlater.

Figure 10:
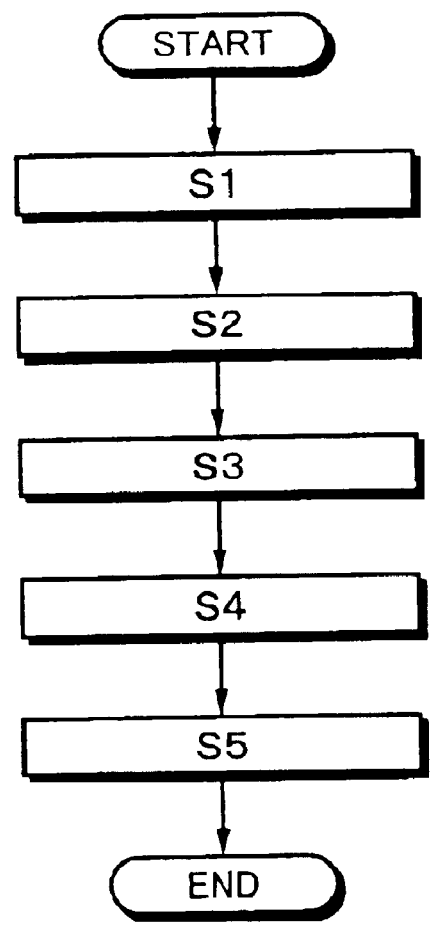
FIG. 10 is a flowchart for explaining a process for recording audio data into the HD recording and reproducing apparatus according to the embodiment of the invention.

FIG. 10 is a flowchart for explaining a process for recording the audio data into the HD recording and reproducing apparatus 300. The recording of the audio data into the HD recording and reproducing apparatus 300 denotes that the HD controller 306 forms a file onto the HDD 309 by using the FAT32 file system 308.

First, the HD controller 306 forms a new file onto the HDD 309 by using the FAT32 file system 308 (step S1).

Subsequently, on the basis of control of the HD controller 306, the ATRAC3 encoding/decoding apparatus 303 compresses the digital audio signal which is supplied from the audio input/output unit 400 via the digital audio I/F 301 or the AD/DA I/F 302 by using the ATRAC3 compression coding technique at high sound quality and high efficiency and supplies it to the magic gate core unit 304 (step S2).

Subsequently, on the basis of control of the HD controller 306, the magic gate core unit 304 encrypts the audio data which has been compressed by ATRAC3 and supplies it to the shared RAM 305(step S3).

Subsequently, each time the encryption of one sound unit is finished, the HD controller 306 transfers the data held in the shared RAM 305 to the SDRAM 307 (step S4) and, further, transfers it to the HDD 309 via the FAT32 file system 308 and records the audio data as files onto the HDD 309 (step S5).

If the recording of the audio data according to IEC60958 has been performed and its category belongs to a CD, the HD recording and reproducing apparatus 300 analyzes a C bit and a U bit of the audio data and can record the audio data onto the HDD 309 in order of music piece numbers of the CD.

Figure 11:
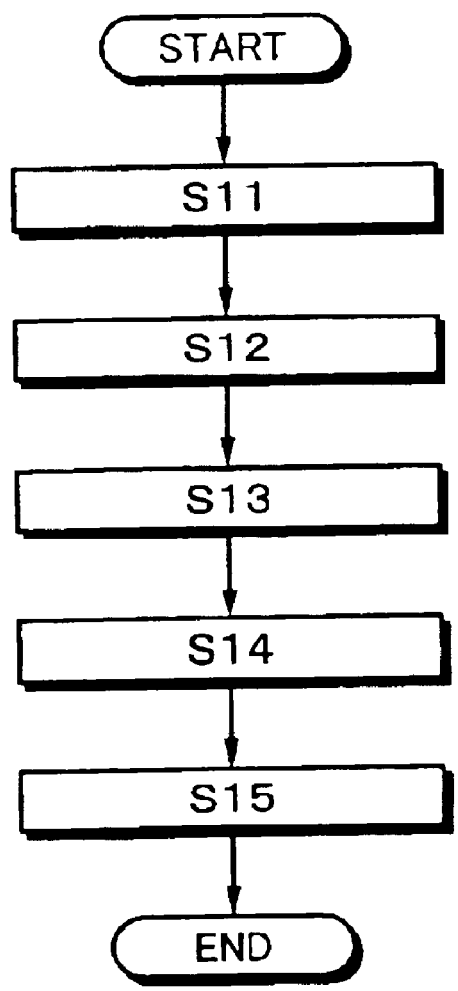
FIG. 11 is a flowchart for explaining a process for recording the audio data into the HD recording and reproducing apparatus according to the embodiment of the invention.

FIG. 11 is a flowchart for explaining a process for recording the audio data into the HD recording and reproducing apparatus 300. The reproduction of the audio data using the HD recording and reproducing apparatus 300 denotes that the HD controller 306 opens the music files recorded on the HDD 309 and reads out the data.

First, the HD controller 306 opens a desired file to be reproduced by using the FAT32 file system 308 (step S11) and reads out the opened file from the HDD 309 and stores it into the SDRAM 307 (step S12).

Subsequently, each time the decoding of one sound unit is finished in the magic gate core unit 304, the HD controller 306 transfers one sound unit from the SDRAM 307 to the shared RAM 305 (step S13).

Subsequently, the magic gate core unit 304 decodes the audio data supplied from the HD controller 306 via the shared RAM 305 and transmits it to the encoding/decoding apparatus 303 (step S14).

Subsequently, the encoding/decoding apparatus 303 decompresses the audio data supplied from the magic gate core unit 304 and transmits it to the audio input/output unit 400 via the digital audio I/F 301 or the AD/DA I/F 302 (step S15).

500 receivers (files) called albums for grouping a plurality of music (tracks) have been prepared in the HD recording and reproducing apparatus 300 according to the embodiment of the invention. Further, besides those albums, 10 receivers (files) called play lists which can collect arbitrary tracks actually recorded on the HDD 309 have been also prepared. It is a difference between the album and the play list that although the former is a receiver (file) for inputting the recorded music itself, the latter is a receiver (file) for inputting the data linked to the music (track) held in the former receiver (file) and is not a receiver (file) for holding the substance of the music file itself.

The number of music files which can be recorded in one album is equal to 400 (400 music pieces). The limitation of the number of tracks in one album is also applied to the play list. Therefore, the music of up to 200 thousand music pieces (500 albums×400 tracks) can be held in the HD recording and reproducing apparatus 300. In the dubbing apparatus of an integrated type of the disc reproducing apparatus 200 and the HD recording and reproducing apparatus 300 to which the invention is applied, there is limitation of maximum 20 thousand music pieces in order to guarantee comfortable music reproduction and recording.

Figure 12:
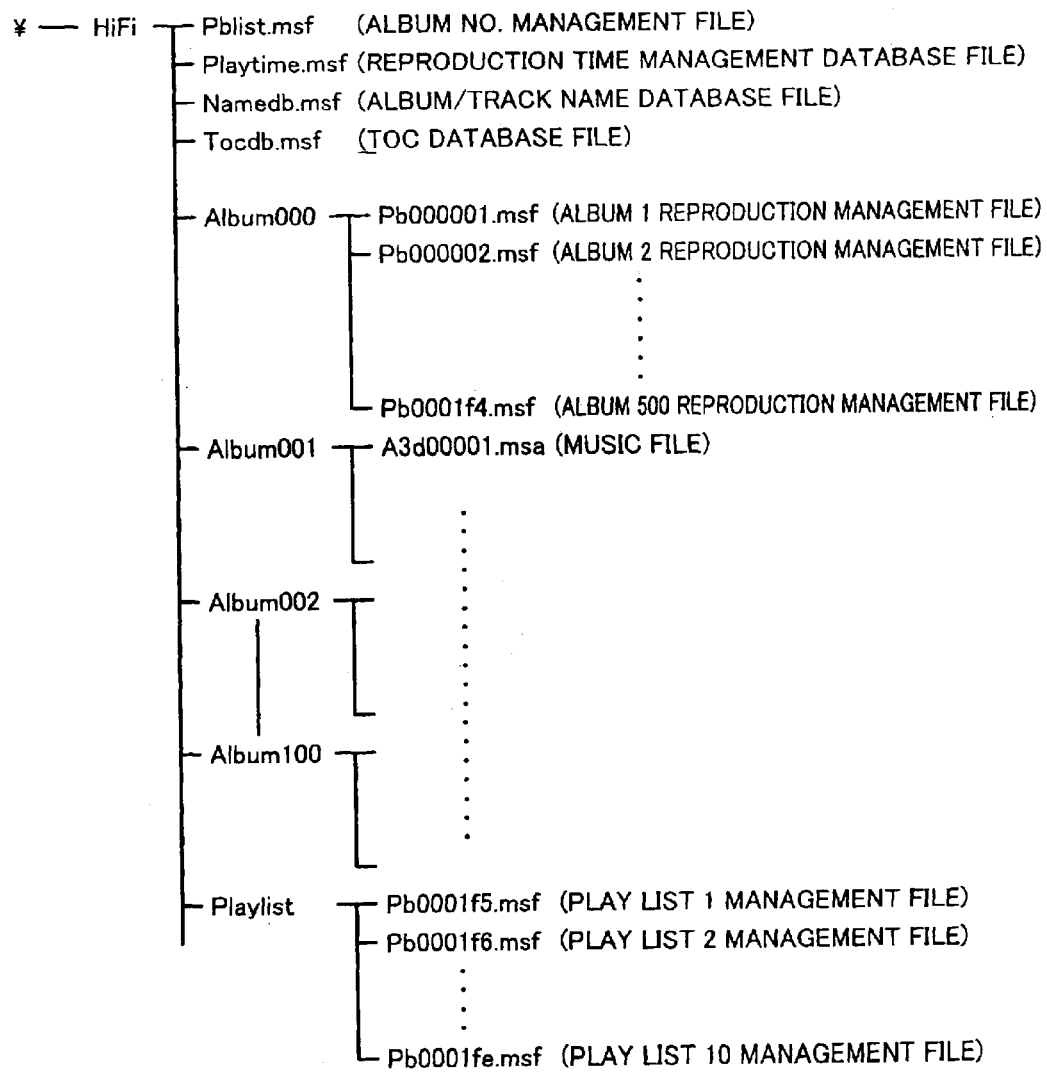
FIG. 12 is a tree diagram showing a structure of a file which is stored in an HDD.

FIG. 12 is a tree diagram showing a structure of the file which is stored in the HDD 309. The music files and a database file for managing the music files are located under a directory HiFi under a route directory. An album number management file Pblist.msf (hereinafter, simply referred to as Pblist) (16 kB) called an album playback list indicative of the reproducing order of 500 albums has been stored under the HiFi directory. File numbers of the reproduction management files of 500 albums have been written in the Pblist. In this directory, besides the Pblist, there have been stored: an album/track name database file Namedb.msf (hereinafter, simply referred to as Namedb) in which album names, track names, and artist names of all of the albums and tracks are stored as a database; a reproduction time management database file Playtime.msf (hereinafter, simply referred to as Playtime) in which a reproduction time of all of the tracks is stored as a database; and a TOC database file Tocdb.msf (hereinafter, referred to as Tocdb) constructed in a manner such that a TOC of the optical disc at the time of executing the recording synchronously with the disc reproducing apparatus 200 is obtained, thereby enabling names to be allocated to each album and each track by using a service such as CDDB (Compact Disc Data Base) or the like later. Album reproduction management files Pb000001.msf to Pb0001f4.msf (hereinafter, simply referred to as Pb000000) called playback lists in which data such as the total number of tracks, album names, reproduction music piece order, album highlight, and the like included in each of the 500 albums has been stored have been stored in a directory Album000 locating under the HiFi directory.

100 directories Album001 to Album100 locating under the HiFi directory are directories for storing the recorded music files. Since the music files of maximum 20 thousand music pieces can be formed, if all of those music files are held in the same directory, it takes a long time for the FAT32 file system 308 to search the location of the file. To shorten such a time, it is effective to distribute the music files and store them. Because of such a reason, the recorded music files have been distributed to 100 directories Album001 to Album100 and stored. The music files have file names A3dxxxxx.msa (hereinafter, simply referred to as A3dxxxxx) and serial numbers are allocated to the first to maximum 20000th tracks.

Lastly, a Playlist directory locating under the HiFi directory is a directory for storing the playlist management files Pb0001f5 to Pb0001fe for realizing the foregoing play list function.

FIG. 13 shows a construction of the album number management file Pblist. FIGS. 14A and 14B show a header constructing the album number management file Pblist and the other portions, respectively. The album number management file Pblist has a size of one cluster (1 block=16 kB). The header shown in FIG. 14A consists of 32 bytes. A table Alb-nnn to manage the reproducing order of the albums and a part of information in the header have been recorded in the portions shown in FIGS. 14B other than the header. The heads of those different kinds of data groups have been specified so as to be arranged at predetermined positions in the reproduction management file.

In the album number management file, 32 bytes from the head indicated by (0x0000) and (0x0010) shown in FIG. 14A correspond to the header. A unit partitioned from the head in the file on a 16-byte unit basis is called a slot. Data having the following meanings, functions, and values is arranged in order from the head to the headers arranged in the first and second slots of the file. Data expressed as Reserved shows undefined data. Although null (0x00) is ordinarily written there, even if any characters a rewritten, the data of Reserved is ignored. It can be changed in a future version. Writing into this portion is inhibited. BLKID-TL0 (4 bytes)

Meaning: BLOCKID FILE ID
   Function: Value to identify the head of the album number management file
   Value: Fixed value="TL=0" (for example, 0x544C2D30) REVISION (4 bytes)
   Meaning: The number of rewriting times of the Pblist
   Function: It is increased each time the album number management file is rewritten.
   Value: It starts from 0 and is increased by +1 at a time. T-ABLE (2 bytes)
   Meaning: TOTAL TRACK NUMBER
   Function: The total number of albums
   Value: All-0 is set if 1 to 512 (including the playlist) data does not exist.
Alb-nnn
   Meaning: The SQN (sequence) number of the album which is reproduced
   Function: Describes the file number of each album reproduction management file Pbxxxxxx.msf.
   Value: 1 to 512
   When no album exists, all-0 is set.

Figure 15:
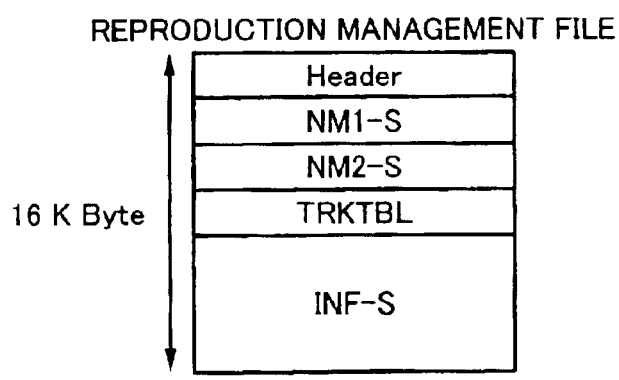
FIG. 15 is a structure diagram of an album reproduction management file Pbxxxxxx.msf.
Figure 16:
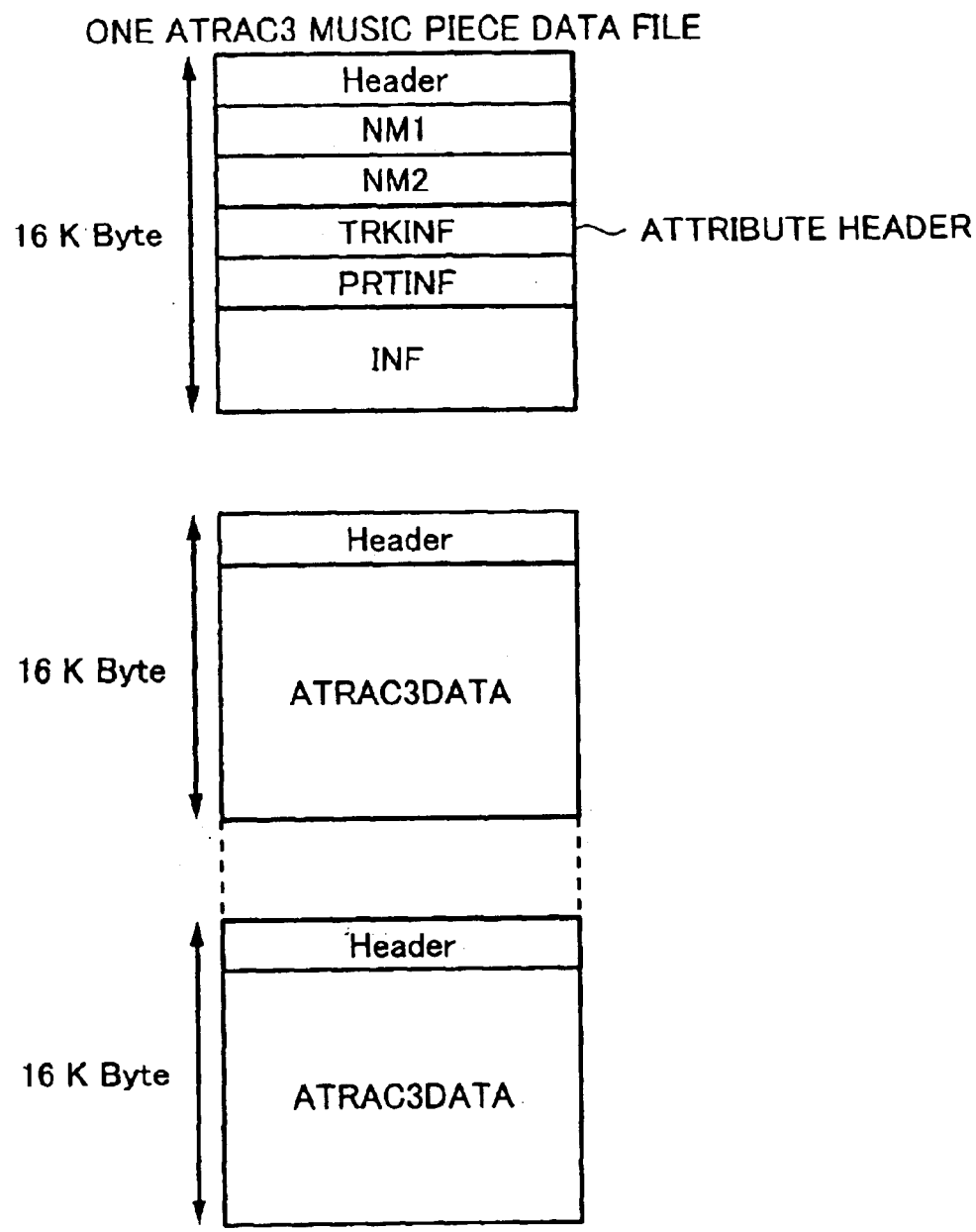
FIG. 16 is a data structure diagram in the case where one continuous ATRAC3 data file is divided on a predetermined unit basis and an attribute file is added.

FIG. 15 shows a construction of the album reproduction management file. FIG. 16 shows a construction of an ATRAC3 data file of one FILE (one music piece). The album reproduction management file is a file having a fixed length of 16 kB. The ATRAC3 data file comprises a head attribute header and actually encrypted audio data subsequent thereto on a music piece unit basis. The attribute header also has a fixed length of 16 kB and has a construction similar to that of the album reproduction management file.

The album reproduction management file shown in FIG. 15 comprises: a header; an area NM1-S to store a 1-byte character string album name; an area NM2-S to store a 2-byte character string album name; a reproduction table TRKTBL of the order of the music pieces; and additional information INF-S. The head attribute header of a data file shown in FIG. 16 comprises: a header; a music piece name NM1 of a 1-byte code; a music piece name NM2 of a 2-byte code; track information TRKINF such as key information and the like of the track; parts information PRTINF; and additional information INF of the track. Information of the total number of parts, an attribute of the name, and a size of additional information, and the like are included in the header.

The audio data of ATRAC3 follows the attribute header. The audio data is divided every block of 16 kB and a header is added to the head of each block. An initial value to decrypt the encryption is included in the header. Only the audio data in the ATRAC3 data file is subjected to the encrypting process and the data in the reproduction management file, header, and the like other than that is not encrypted.

A relation between the music piece and the ATRAC3 data file will be described with reference to FIG. 16. One track denotes one music piece. One music piece is constructed by one ATRAC3 data file (refer to FIG. 16). The ATRAC3 data file is audio data compressed by ATRAC3. The data is recorded onto the HDD 309 on a unit basis called a cluster. One cluster has a capacity of, for example, 16 kB. A plurality of files are not mixed into one cluster.

Although one music piece is fundamentally constructed by one part, there is a case where if it is edited, one music piece is constructed by a plurality of parts. "Part" denotes a unit of data recorded within a continuous time from the start of the recording to its stop. Usually, one track is constructed by one part. A connection of the parts in the music piece is managed by the parts information PRTINF in the attribute header of each music piece. That is, a part size is expressed by data of 4 bytes called a part size PRTSIZE in the PRTINF. Head 2 bytes of the part size PRTSIZE indicate the total number of clusters which the parts have, and each subsequent one byte indicates a position of a start sound unit (hereinafter, abbreviated to SU) and a position of a last SU in the head and last clusters. By possessing such a describing method of the parts, movement of a large amount of audio data which is ordinarily necessary at the time of editing the audio data can be eliminated. If explanation is limited to the editing of a block unit, although the movement of the audio data can be similarly avoided, an editing unit of the block unit is too larger than the SU unit.

SU denotes the minimum unit of the parts and indicates the minimum data unit at the time of compressing the audio data by ATRAC3. The data of hundreds of bytes in which the audio data of 1024 samples (1024×16 bits×2 channels) obtained at a sampling frequency 44.1 kHz has been compressed into about $\frac{1}{10}$ is SU. One SU corresponds to time of about 23 msec. Usually, one part is constructed by thousands of SUs. If one cluster is constructed by 42 SUs, a sound of about one second can be expressed by one cluster. The number of parts constructing one track is influenced by the size of additional information. Since the number of parts is determined by the number excluding the header, music piece names, additional information data, and the like from one block, a state where there is no additional information becomes a condition in which the maximum number (645) of parts can be used.

Figure 17A:
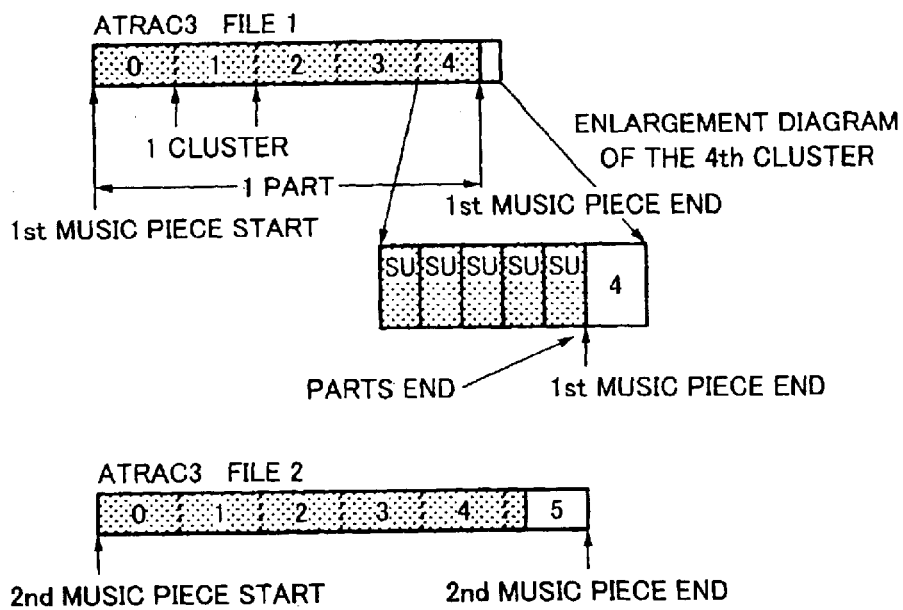
FIG. 17A is a file structure diagram for explaining a combination editing process and a dividing editing process of the invention in the case where audio data of two music pieces is continuously recorded.

FIG. 17A shows a file construction in the case where audio data of two music pieces from a CD or the like is continuously recorded. The first music piece (file 1) is constructed by, for example, 5 clusters. In an interval between the first music piece and the second music piece (file 2), since it is not permitted that two files exist mixedly in one cluster, the file 2 is formed from the beginning of the next cluster. Therefore, an end of the part 1 (end of the first music piece) corresponding to the file 1 is located in the middle of the cluster and no data exists in the residual portion of the cluster. The second music piece (file 2) is also similarly constructed by one part. In the case of the file 1, the part size is equal to 5, the SU of the start cluster is equal to 0, and the SU of the end cluster is equal to 4.

As an editing operation of the track, six kinds of operations of division of the track, combination of the tracks, erasure of the track, movement of the track, addition of the track name, and addition of the artist name of the track are specified. The division denotes that one track is divided into two tracks. If the division is performed, the total number of tracks is increased by 1. The division denotes that one file is divided into two files on the file system and the reproduction management file and the FAT are updated. The combination denotes that two tracks are combined to one track. If the tracks are combined, the total number of tracks is decreased by 1. The combination denotes that two files are combined to one file on the file system and the reproduction management file and the FAT are updated. The erasure denotes that the track is erased. Each track number of the tracks after the erased track is decreased by 1. The movement denotes that the order of the tracks is changed. Also with respect to the erasing and moving processes mentioned above, the reproduction management file and the FAT are updated. The addition of the track name denotes that the track name is allocated to the track. The addition of the artist name denotes that the artist name of the track is allocated to the track.

Figure 17B:
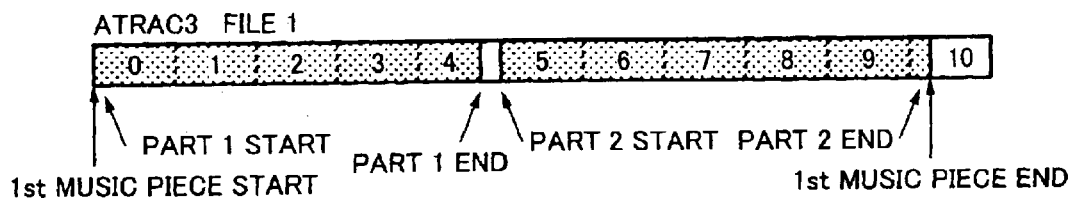
FIG. 17B is a structure diagram showing a result obtained by combining two music pieces by the combination editing process of the invention.
Figure 17C:
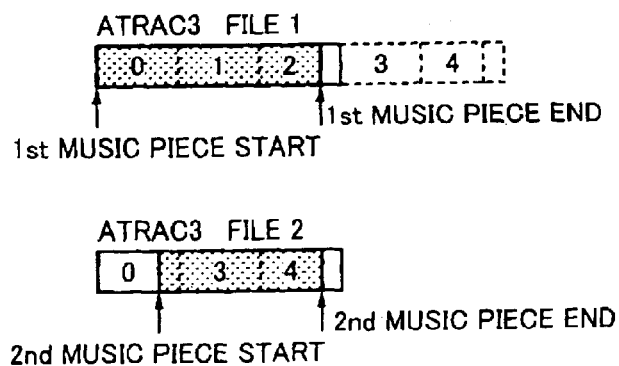
FIG. 17C is a structure diagram showing a result obtained by dividing two music pieces by the dividing editing process of the invention.

A result in which two music pieces (file 1 and file 2) shown in FIG. 17A are combined is shown in FIG. 17B. A result of the combining process becomes one file and this file comprises two parts. FIG. 17C shows a result in which one music piece (file 1) is divided in the middle of the cluster 2. By the division, a file 1 comprising the clusters 0 and 1 and a front side of the cluster 2 and a file 2 comprising a rear side of the cluster 2 and the clusters 3 and 4 are generated.

As mentioned above, according to the embodiment, since there is a describing method regarding the parts, in FIG. 17B showing the combined result, each of the start position of the part 1, the end position of the part 1, the start position of the part 2, and the end position of the part 2 can be specified by the SU unit. Thus, there is no need to move the audio data of the part 2 in order to fill a gap at a combining portion of the combined result. Since there is a describing method regarding the parts, in FIG. 17C showing the divided result, there is no need to move the data so as to fill a head space of the file 2.

As an editing operation of the album, the erasure of the album, the movement of the album, the addition of the album name, the addition of the artist name, and the like have been specified. The erasure of the album denotes that the album is erased. Each album number of the albums after the erased album is decreased by 1. The movement of the album denotes that the order of the albums is changed. Also with respect to the erasing and moving processes mentioned above, the album number management file and the FAT are updated. The addition of the album name denotes that the album name is allocated to the album. The addition of the artist name of the album denotes that the artist name is allocated to the album.

FIG. 18 shows a more detailed data construction of the album reproduction management file. FIGS. 19A and 19B show a header constructing the album reproduction management file and the other portions, respectively. The album reproduction management file has a size of one cluster (1 block=16 kB). The header shown in FIG. 19A consists of 32 bytes. In the portions shown in FIG. 12B other than the header, aname NM1-S (256 bytes), a name NM2-S (512 bytes), CONTENTSKEY, C_MAC[0], S-YMDhms, a table TRKTBL (800 bytes) to manage the reproducing order, and additional information INF-S (14720 bytes) have been recorded and a part of the information in the header has finally been recorded again. The head of each of those different kinds of data groups has been specified so as to be arranged at a predetermined position in the reproduction management file.

In the album reproduction management file, 32 bytes from the head shown by (0x0000) and (0x0010) shown in FIG. 19A correspond to the header. A unit partitioned from the head in the file on a 16-byte unit basis is called a slot. Data having the following meanings, functions, and values is arranged in order from the head to the headers arranged in the first and second slots of the file. Data expressed as Reserved shows undefined data. Although null (0x00) is ordinarily written there, even if any characters are written, the data of Reserved is ignored. It can be changed in a future version. Writing into this portion is inhibited. All portions written as Option are handled in a manner similar to those of Reserved if they are not used. BLKID-TL0 (4 bytes)

Meaning: BLOCKID FILE ID

Function: Value to identify the head of the reproduction management file

Value: Fixed value="TL=0" (for example, 0x544C2D30)

MCode (2 bytes)

Meaning: MAKER CODE

Function: A code to identify a maker and a model of the apparatus which recorded Value: Upper 10 bits (maker code) and lower 6 bits (apparatus kind code)

REVISION (4 bytes)

Meaning: The number of rewriting times of the album reproduction management file Function: It is increased each time the album reproduction management file is rewritten.

Value: It starts from 0 and is increased by +1 at a time.

SN1C+L (2 bytes)

Meaning: Indicates an attribute of a title (one byte) of the album which is written in the NM1-S area Function: Each of a character code and a language code which are used is expressed by one byte.

Value: A character code (C) distinguishes the characters in the following manner by upper one byte 00: The character code is not set but is handled as a simple binary number 01: ASCII (American Standard Code for Information Interchange)

02: ASCII+KANA 03: modifided8859-1

81: MS-JIS 82: KS C 5601-1989

83: GB (Great Britain) 2312-80

90: S-JIS (Japanese Industrial Standards) (for Voice).

A language code (L) distinguishes the languages by lower one byte in the following manner in accordance with EBU Tech 3258 regulation.

00: Notset 08: German 09: English 0A: Spanish

0F: French 15: Italian 1D: Dutch

65: Korean 69: Japanese 75: Chinese

If there is no data, all-0 is set.

SN2C+L (2 bytes)

Meaning: Indicates an attribute of a title (2 bytes) of the album written in the NM2-S area Function: Each of a character code and a language code which are used is expressed by one byte.

Value: The same as SN1C+L mentioned above

SINFSIZE (2-bytes)

Meaning: Indicates a total size of all data of the additional information which is written in the INF-S area Function: A data size is described on a unit basis of 16 bytes. If there is no data, all-0 is certainly set.

Value: The size lies within arange from 0x0001 to 0x39C (924).

T-TRK (2 bytes)

Meaning: TOTAL TRACK NUMBER

Function: The total number of tracks

Value: From 1 to 0x0190 (maximum 400 tracks). If there is no data, all-0 is set.

The data (FIG. 19B) which is written in the area subsequent to the foregoing header will be described hereinbelow.

NM1-S

Meaning: Area to store the 1-byte character string album name

Function: Name data (maximum 256 data) of a variable length expressed by a character code of one byte When the name data is finished, an end code (0x00) certainly has to be written.

The size has to be calculated from the end code. If there is no data, null (0x00) of a length of at least 1 byte or more has to be recorded from the head (0x0020).

Value: Various character codes

NM2-S

Meaning: Area to store the 2-byte character string album name

Function: Name data (maximum 512 data) of a variable length expressed by a character code of 2 bytes When the name data is finished, the end code (0x00) certainly has to be written.

The size has to be calculated from the end code. If there is no data, null (0x00) of a length of at least 2 bytes or more has to be recorded from the head (0x0120).

Value: Various character codes

CONTENTS KEY

Meaning: A value prepared every music piece. After it is protected by MG(R), it is stored. The same value as CONTENTS KEY allocated to the first music piece.

Function: A key which is necessary for calculation of MAC of S-YMDhms

Value: From 0 to 0xFFFFFFFFFFFFFFFF

MAC

Meaning: Copyright information alteration check value

Function: A value which is formed from the contents of S-YMDhms and CONTENTS KEY Value: From 0 to 0xFFFFFFFFFFFFFFFF TRK-nnn Meaning: The SQN (sequence) number of the ATRAC3 data file which is reproduced Function: Describes FNo in TRKINF.

Value: From 1 to 400 (0x190)

When no track exists, all-0 is set.

INF-S

Meaning: Album additional information (for example, additional information such as an artist name or the like)

Function: Additional information data of a variable length associated with the header There is a case where a plurality of different additional information are arranged. An ID and a data size are allocated to each of them. The additional information data including each header is constructed by a unit which is equal to or larger than minimum 16 bytes and is integer times as large as 4 bytes. Its details will be explained hereinlater.

Value: The construction of the additional information data is referred to.

S-YMDhms (4 bytes) (Option)

Meaning: Year, month, day, hour, minute, and second when the data is recorded by an apparatus having a reliable clock.

Function: Value to identify the final recording date and time. It is indispensable at the time of EMD Value: 25~31 bits year 0~99 (1980~2079)

21~24 bits month 0~12

16~20 bits day 0~31

11~15 bits hour 0~23

05~10 bits minute 0~59

00~04 bits second 0~29 (2-second unit)

As a last slot of the reproduction management file, the same BLKID-TL0, MCode, and REVISION as those in the header are written.

As an industrial-use audio apparatus, there is a case where a memory card is pulled out during the recording or a power source is turned off. When such a situation is recovered, it is necessary to detect the occurrence of such abnormality. As mentioned above, REVISION is written to the head and end of the block and each time this value is rewritten, it is increased by +1. If the end of abnormality occurs in the middle of the block, the values of REVISION at the head and the end do not coincide and the abnormality end can be detected. Since two REVISION exist, the abnormality end can be detected at a high probability. When the abnormality end is detected, a warning such as a display or the like of an error message occurs.

Since the fixed value BLKID-TL0 has been inserted into the head portion of one block (16 kB), the fixed value can be used as an index for recovery in the case where the FAT is broken. That is, by checking the fixed value at the head of each block, the kind of file can be discriminated. Moreover, since the fixed value BLKID-TL0 is described twice in the header of the block and the end portion of the block, its reliability can be checked. The same value as that in the album reproduction management file can be also recorded twice.

The ATRAC3 data file has a data amount which is remarkably larger than that of the track information management file and, with respect to the ATRAC3 data file, a block number BLOCK SERIAL has been allocated as will be explained hereinlater. In the ATRAC3 data file, usually, since a plurality of files exist on the HDD 309, if BLOCK SERIAL is not allocated after contents were distinguished by CONNUM0, overlap occurs, so that a recovery of the file in the case where the FAT is broken is difficult. In other words, since there is a possibility that the single ATRAC3 data file is constructed by a plurality of BLOCKs and discretely arranged, in order to distinguish BLOCK constructing the same ATRAC3 data file, CONNUM0 is used and the ascending order in the same ATRAC3 data file is determined by the block number BLOCK SERIAL.

Similarly, a maker code (MCode) has been recorded in the head and the end of the block in a manner such that if the logic is erroneously taken and there is a problem as a file although the FAT is not broken, the kind of maker which wrote can be specified.

FIG. 19C shows a construction of the additional information data. The following headers are written at the head of the additional information. Data of a variable length is written after the headers.

INF
    Meaning: FIELD ID
    Function: Fixed value showing the head of the additional information data
    Value: 0x69

ID
    Meaning: Additional information key code
    Function: Indicates the kind of additional information
    Value: From 0 to 0xFF SIZE
    Meaning: Size of individual additional information
    Function: Although the data size can be freely set, it certainly has to be a value that is integer times as large as 4 bytes and be equal to or larger than minimum 16 bytes. If there is a remainder after the end of the data, it is filled with null (0x00).
    Value: From 16 to 14784 (0x39C0)

MCode
    Meaning: MAKER CODE
    Function: A code to identify a maker and a model of the apparatus which recorded the data
    Value: Upper 10 bits (maker code) and lower 6 bits (apparatus kind code)

C+L
    Meaning: Indicates an attribute of characters which are written in the data area from the 12th byte from the head
    Function: Each of a character code and a language code which are used is expressed by one byte.
    Value: The same as that of SNC+L mentioned above DATA
    Meaning: Individual additional information data
    Function: Shown by variable length data. The head of the real data always has to start from the 12th byte, and its length (size) always has to be equal to minimum 4 bytes or more and be a value that is integer times as large as 4 bytes. If there is a remainder after the end of the data, it is filled with null (0x00).
    Value: Individually defined in accordance with the contents FIG. 20 shows a data array of the ATRAC3 data file A3Dnnnn in the case where the ISU consists of N bytes (for example, N=384 bytes). An attribute header (1 block) of the data file and the audio data file (1 block) are shown in FIG. 20. In FIG. 20, bytes (0x0000 to 0x7FF0) at the head of each slot of those two blocks (16×2=32 kbytes) are shown. As separately shown in FIG. 21, 32 bytes from the head of the attribute header correspond to the header, 256 bytes indicate the music name area NM1 (256 bytes), and 512 bytes indicate a music name area NM2 (512 bytes). The following data is written in the headers of the attribute header.

BLKID-HD0 (4 bytes)
    Meaning: BLOCKID FILE ID
    Function: A value to identify the head of the ATRAC3 data file
    Value: Fixed value="HD=0" (for example, 0x48442D30)

MCode (2 bytes)
    Meaning: MAKER CODE
    Function: A Code to identify a maker and a model of the apparatus which recorded
    Value: Upper 10 bits (maker code) and lower 6 bits (apparatus kind code)

Block Serial (4 bytes)
    Meaning: Serial number allocated to each track
    Function: The head of the block starts from 0 and a value of the next block is not changed even if it is increased and edited by +1 at a time.
    Value: Starts from 0 and reaches 0xFFFFFFFF N1C+L (2 bytes)
    Meaning: Indicates attributes of the track (music piece name) and the data (NM1)
    Function: Each of a character code and a language code which are used in NM1 is expressed by one byte.
    Value: The same as that of SN1C+L N2C+L (2 bytes)
    Meaning: Indicates attributes of the track (music piece name) and the data (NM2)
    Function: Each of a character code and a language code which are used in NM2 is expressed by one byte.
    Value: The same as that of SN1C+L INFSIZE (2 bytes)
    Meaning: Indicates a total size of all of the additional information regarding the tracks
    Function: A data size is described on a unit basis of 16 bytes. If there is no data, all-0 is certainly set.
    Value: The size lies within a range from 0x0000 to 0x3C6 (966).

T-PRT (2 bytes)
    Meaning: The total number of parts
    Function: Indicates the number of parts constructing the track. Usually, it is equal to 1.
    Value: From 1 to 0x285 (645 dec)

T-SU (4 bytes)
    Meaning: The total number of SUs
    Function: Indicates the total number of actual SUs in one track. Corresponds to the play time of a music piece.
    Value: From 0x01 to 0x001FFFFF INX (2 bytes) (Option)
    Meaning: Relative location of INDEX
    Function: A pointer indicative of the head of a main melody (characteristic portion) of the music piece. The position from the head of the music piece is designated by the number obtained by dividing the number of SUs into ¼. It corresponds to a time (about 93 msec) of a period which is four times as long as that of the ordinary SU.

Value: From 0 to 0xFFFF (maximum about 6084 seconds)

XT (2 bytes) (Option)

Meaning: Reproduction time of INDEX

Function: Designated by the number of SUs of the time to be reproduced from the head designated by INX-nnn divided into ¼. It corresponds to a time (about 93 msec) of a period which is four times as long as that of the ordinary SU.

Value: 0x0000: not set From 0x01 to 0xFFFE (maximum 6084 seconds) 0xFFFF: To the end of the music piece The music piece name areas NM1 and NM2 will now be described.

NM1

Meaning: A character string indicative of the name of a music piece

Function: Music piece name (maximum 256 names) of a variable length expressed by a character code of 1 byte The end of name data certainly has to be written by the end code (0x00). The size has to be calculated from the end code. If there is no data, null (0x00) of a length of at least 1 byte or more has to be recorded from the head (0x0020).

Value: Various character codes

NM2

Meaning: Character string indicative of the music piece name

Function: Name data (maximum 512 name data) of a variable length expressed by a character code of 2 bytes The end of name data certainly has to be written by the end code (0x00). The size has to be calculated from the end code. If there is no data, null (0x00) of a length of at least 2 bytes or more has to be recorded from the head (0x0120).

Value: Various character codes

Data of 80 bytes starting from a fixed position (0x320) of the attribute header is called a track information area TRKINF. Mainly, information regarding the security and copy control is managed in a lump. FIG. 22 shows a portion of TRKINF. Data in TRKINF will be described hereinbelow in arranging order.

CONTENTS KEY (8 bytes).

Meaning: A value prepared for every music piece. After the value is protected by MG(R), it is held.

Function: A first key which is necessary first when a music piece is reproduced. It is used for the MAC calculation.

Value: From 0 to 0xFFFFFFFFFFFFFFFF

C⁻MAC[0] (8 bytes)

Meaning: Copyright information alteration check value

WM

Meaning: Water Mark

Function: Indicates a Water Mark state of the contents A (1 byte)

Meaning: Attribute of the parts

Function: Indicates information such as a compression mode or the like in the parts Value: Explanation will be made hereinbelow with reference to FIG. 23.

Monaural of N=0, 1 is specified by setting the subsignal to 0 when bit 7 is equal to 1 and setting a special Joint mode of only a main signal (L+R) to monaural. In the ordinary reproducing apparatus, information of bit 2 and bit 1 can be ignored.

Bit 0 of A forms information of ON/OFF of emphasis. Bit 1 forms information indicative of either the reproduction SKIP or the normal reproduction. Bit 2 forms information indicative of data division, for example, either the audio data or other data such as FAX data or the like. Bit 3 is undefined. By combining bit 4, bit 5, and bit 6, the mode information of ATRAC3 is specified as shown in the diagram. That is, N indicates a value of the mode shown by those three bits. With respect to five kinds of modes such as monaural (N=0, 1), LP (N=2), SP (N=4), EX (N=5), and HQ (N=7), a recording time, a data transfer rate, and the number of SUs in one block are shown, respectively. The number of bytes of 1 SU is set to (monaural: 136 bytes, LP: 192 bytes, SP: 304 bytes, EX: 384 bytes, HQ: 512 bytes). Further, the mode (0: Dual, 1: Joint) of ATRAC3 is shown by bit 7.

LT (1 byte)

Meaning: A reproduction limitation flag (bit 7 and bit 6) and a security version (bit 5 to bit 0)

Function: Indicates that there are limitation items with respect to this track.

Value: Bit 7: 0=no limitation 1=limitation

Bit 6: 0=within term 1=expired

Bit 5~bit 0: Security version 0

(In the case of other than 0, the reproduction is inhibited)

FNo (2 bytes)

Meaning: File number

Function: Track number at the time when the data is recorded first. This value specifies the position of a value for the MAC calculation recorded in a hidden area in a memory card.

Value: From 1 to 0x190 (400)

MG(D)SERIAL-nnn (16 bytes)

Meaning: Serial number of a security block (security IC20) of the recording apparatus Function: Peculiar values all of which are different every recording apparatus Value: From 0 to 0xFFFFFFFFFFFFFFFFFFFFFFFFFFFFFFFF CONNUM (4 bytes)

Meaning: Contents accumulation number

Function: A peculiar value which is accumulated every music piece. It is managed by the security block of a recording apparatus. The numbers as many as $2^{32}$ that is, 4.2 billion music pieces are prepared and used for identifying the recorded music pieces.

Value: From 0 to 0xFFFFFFFF

YMDhms-S (4 bytes) (Option)

Meaning: Startdate/time of reproduction of a track with reproduction limitation

Function: Date/time when the start of the reproduction is permitted and which are designated by EMD Value: The same as the expression as that of the foregoing date/time YMDhms-E (4 bytes) (Option)

Meaning: Reproduction end date/time of a track with reproduction limitation

Function: Date/time when the permission of the reproduction is finished and which are designated by EMD Value: The same as the expression as that of the foregoing date/time MT (1 byte) (Option)

Meaning: The maximum value of the number of reproduction permitting times

Function: The maximum number of reproducing times which is designated by EMD

Value: From 1 to 0xFF If it is not used, 0x00is set. When a value of bit 7 of LT is equal to 0, a value of MT is set to 00.

CT (1 byte) (Option)

Meaning: The number of reproducing times

Function: The number of times at which data can be actually reproduced among the number of reproduction permitting times. It is decreased every reproduction.

Value: From 0x00to 0xFF If it is not used, 0x00is set. If bit 7 of LT is equal to 1 and a value of CT is equal to 00, the reproduction is inhibited.

CC (1 byte)

Meaning: COPY CONTROL

Function: Copy control

Value: As shown in FIG. 24, copy control information is shown by bit 6 and bit 7. Copy control information regarding a high speed digital copy is shown by bit 4 and bit 5. A security block authentication level is shown by bit 2 and bit 3. Bit 0 and bit 1 are undefined.

Example of CC:
(bit 7, bit 6) 11: unlimited copy is permitted, 01: copy never, 00: copy one generation
(bit 3, bit 2) 00: Recording from analog or digital-in. The MG authentication level is set to 0.

In the digital recording from a CD, (bit 7, bit 6) are set to 00 and (bit 3, bit 2) are set to 00.

CN (1 byte) (Option)

Meaning: The number of copy permitting times in the high speed digital copy HSCMS (High speed Serial Copy Management System)

Function: Distinction between "copy one generation" and "copy freely" is expanded and it is designated by the number of copying times. It is valid only in the case of "copy one generation" and subtracted every copy.

Value: 00: copy never, 01 to 0xFE: the number of copying times, 0xFF: the number of copying times is unlimited.

Subsequent to the foregoing track information area TRKINF, data of 24 bytes starting from 0x0370 is called a parts information area PRTINF for management of the parts. In the case of constructing one track by a plurality of parts, PRTINF is arranged in order of the time base. FIG. 25 shows the portion of PRTINF. The data in PRTINF will be described hereinbelow in arranging order.

PRTSIZE (4 bytes)

Meaning: Parts size

Function: Indicates a size of part. Cluster: 2 bytes (most significant), Start SU: 1 byte (upper), End SU: 1 byte (least significant)

Value: Cluster: from 1 to 0x1F40 (8000), Start SU: from 0 to 0xA0 (160), End SU: from 0 to 0xA0 (160) (where, the counting of SU is started from 0 in order of 0, 1, 2.)

PRTKEY (8 bytes)

Meaning: A value to encrypt the parts

Function: Initial value=0. Upon editing, it conforms with the editing rule.

Value: From 0 to 0xFFFFFFFFFFFFFFFF

CONNUMO (4 bytes)

Meaning: Contents accumulation number key formed first

Function: Role of ID to make the contents unique

Value: It is set to the same value as that of a contents accumulation number initial value key.

As shown in FIG. 20, additional information INF is included in the attribute header of the ATRAC3 data file. This additional information is the same as the additional information INF-S (refer to FIGS. 18 and 19B) in the reproduction management file except a point that the start position is not fixed. A portion next to the last byte portion (4-byte unit) of one or a plurality of parts is set to the start position and the data of the additional information INF starts.

INF

Meaning: Additional information data regarding the track

Function: Additional information data of a variable length associated with a header. There is a case where a plurality of different additional information are arranged. An ID and a data size are allocated to each of them. The additional information data including each header is constructed by a unit which is equal to or larger than minimum 16 bytes and is integer times as large as 4 bytes.

Value: The same as that of the additional information INF-S in the reproduction management file.

Data of each block in the ATRAC3 data file follows the foregoing at tribute header. As shown in FIG. 26, a header is added every block. The data of each block will be explained hereinbelow.

BLKID-A3D (4 bytes)

Meaning: BLOCKID FILE ID

Function: A value to identify the head of the ATRAC3 data

Value: Fixed value="A3D" (for example, 0x41334420)

MCode (2 bytes)

Meaning: MAKER CODE

Function: A code to identify a maker and a model of the apparatus which recorded Value: Upper 10 bits (maker code) and lower 6 bits (apparatus kind code)

CONNUMO (4 bytes)

Meaning: Contents accumulation number formed first

Function: A role of ID to make the contents unique. Even if this number is edited, its value is not changed.

Value: It is set to the same value as that of the contents accumulation number initial value key.

BLOCK SERIAL (4 bytes)

Meaning: Serial number allocated to each track

Function: The head of the block starts from 0 and the next block is increased by +1 at a time.

Even if this number is edited, its value is not changed.

Value: Starts from 0 and reaches 0xFFFFFFFF

BLOCK-SEED (8 bytes)

Meaning: One key to encrypt one block

Function: At the head of the block, random numbers are formed in the security block of the recording apparatus. The subsequent block is set to the value which has been increased by +1. If this value is lost, no sound can be generated for about one second corresponding to one block. Therefore, the same data is written twice in the header and the end of the block. Even if the data is edited, its value is not changed.

Value: An initial value is set to random numbers of 8 bytes

INITIALIZATION VECTOR (8 bytes)

Meaning: Initial value necessary for encrypting and decrypting the ATRAC3 data every block Function: The head of the block starts from 0 and the next block is set to a value of last encrypted 8 bytes of the last SU. In the case of a portion from a middle of the divided block, last 8 bytes just before the start SU are used. Even if the data is edited, its value is not changed.

Value: From 0 to 0xFFFFFFFFFFFFFFFF

SU-nnn

Meaning: Data of sound unit

Function: Data compressed from 1024 samples. The number of bytes which are outputted differs in dependence on the compression mode. Even if the data is edited, its value is not changed. (For example, in the SP mode, N=384 bytes)

Value: A data value of ATRAC3

In FIG. 20, since N=384, 42 SUs are written into one block. Two head slots (4 bytes) of one block are set to a header. BLKID-A3D, MCode, CONNUM0, and BLOCK SERIAL are written twice in the last one slot (2 bytes). Therefore, residual area M bytes of one block are (16, 384−384×42−16×3=208 (bytes)). As mentioned above, BLOCK SEED of 8 bytes is recorded twice therein.

By using the foregoing album number management file, album reproduction management file, and music file, the reproducing order of 1 to 500 albums, the reproducing order of music (tracks) included in each album, and the recordable tracks can be obtained, and the album name of each album, the track name of each track, the artist name of each of the albums/tracks, the total play time of each album, and the total play time of each track can be obtained. However, in the case of those information, since it is necessary that the files stored in the HDD 309 are actually opened and read out one by one, it is impossible to obtain a comfortable operation environment as a system. Therefore, the foregoing information is constructed as a database and, in addition to the files mentioned above, the album/track name database file Namedb and the reproduction time management database file Playtime are formed under the HiFi directory so as to enable desired information to be rapidly obtained. Those files will be described hereinbelow.

FIG. 27 shows a construction of the album/track name database file Namedb. Namedb is a file for searching at a high speed the names (album, music piece name, artist name) registered in the name fields NM1 and NM2 and the additional information INF (artist name) of Pblist, Pbxxxxxx, and A3dxxxxx. Only the names have been recorded in this file. Namedb is constructed by 9 album name blocks and 323 music piece name blocks (one block consists of 16 kB).

Each block (16 kB) is constructed by one BLK record (fixed length of 8 bytes) and 62 name records (fixed length of 264 bytes (62 records)). Therefore, although 558 (=62×9) name records of the album name block can be recorded, in the embodiment of the invention, up to 510 name records are validated and the subsequent records are set to invalid data (fixed to 0x00). Although 200026 (=323×62) name records can be recorded as name records of the music piece name block, in the embodiment of the invention, up to 20000 name records are validated and the subsequent name records are set to invalid data (0x00 fixed). A file size is set to 332 blocks×16384 (16 kB)=5439488 bytes (5312 kB).

Figure 28:
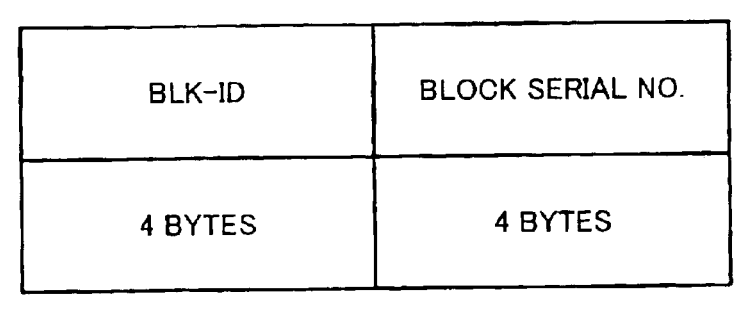

FIG. 28 shows a construction of the BLK record. BLK-ID (4 bytes) is a fixed character string "ANMO" in the album name block and is a fixed character string "TNMO" in the music piece name block. It is assumed that the block serial number (4 bytes) is set to a serial number from 1.

FIG. 29 shows a construction of the name record. The records are recorded in order of the album file Nos. 1 to 500 and in order of the music piece file Nos. 1 to 20000. The records of the album/music piece file No. 0 are assumed to be invalid data.

FIG. 30 shows a construction of the reproduction time management database file Playtime. This Playtime is a file for enabling the total play time of the album unit to be obtained at a high speed. The play time of each music piece has been recorded in this file. An index and TNO concerned with TOC information in a TOC database, which will be explained hereinlater, have been recorded. This Playtime consists of 15 blocks (1 block, 16 kB).

Each block (16 kB) comprises one BLK record (8 bytes, fixed length), 1365 TRK records (12 bytes, fixed length (1365)), and a reservation record (4 bytes, fixed length (0x00 fixed)). Therefore, although 20475 (=1365×15) data can be recorded in the TRK records, in the embodiment of the invention, up to 20000 records are validated and the subsequent records are set to invalid data (0x00 fixed). A file size is equal to 15 blocks×16384=245760 bytes (240 kB).

Figure 31:
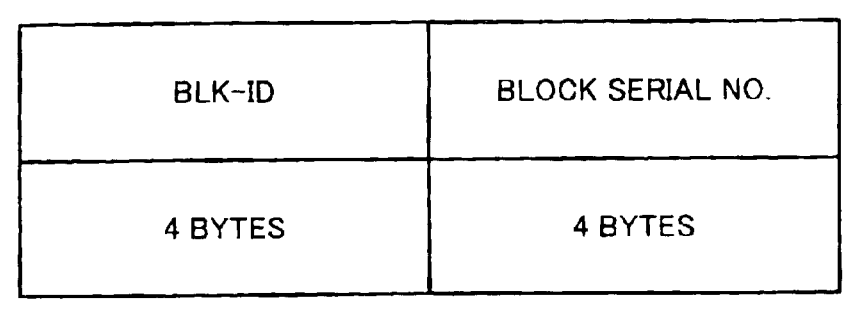

FIG. 31 shows a construction of the BLK record portion in the format of the record. BLK-ID is set to a fixed character string "TRKO" and a block serial number is assumed to a serial number from 1.

FIG. 32 shows a construction of the TRK record. The records are recorded in order of the music piece file Nos. 1 to 20000. The record of the album file No. 0 is set to invalid data. Since the album file number of the play list is not set, the total play time of the play list is calculated by obtaining the TRK record from the reproducing order file number in Pbnnnnnn.MSF (nnnnnn: 0001F5 to 0001FE).

In the dubbing apparatus according to the embodiment of the invention, the synchronous recording (synchro recording) from the disc reproducing apparatus 200 as a reproducing source side to the HD recording and reproducing apparatus 300 as a recording destination side can be performed. Before the synchronous recording is started, the HD recording and reproducing apparatus 300 requests the disc reproducing apparatus 200 to transmit the TOC data of the CD which will be reproduced. As a data requesting method, there is a method whereby besides the system control signal shown in FIG. 1, an IEC60958 audio signal is inputted to the HD recording and reproducing apparatus 300 and information included in U bit of the audio signal is analyzed by using a digital-in interface circuit of the HD recording and reproducing apparatus 300. By holding the TOC information of the CD as a reproducing source side into a database file, when connecting to a site in which the CD information on the Internet such as CDDB or the like can be obtained later, the name can be allocated to the album track recorded in the HD recording and reproducing apparatus 300. The database file used for this purpose is Tocdb.

Figures 33, 34:
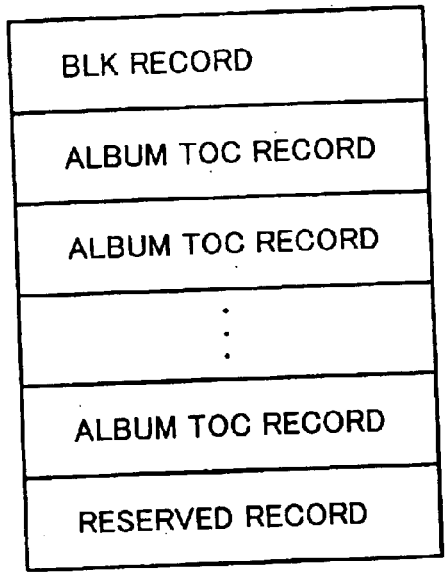
FIG. 33 is a structure diagram of a CD TOC database file Tocdb.msf.
FIG. 34 shows a block ID portion of the CD TOC database file Tocdb.msf.

FIG. 33 shows a construction of the TOC database file Tocdb. This TOC database file Tocdb is a file for allocating the album name and the track name to the album and the track recorded in the HD recording and reproducing apparatus, 300 by using a site on the Internet such as CDDB or the like. Specifically speaking, TOC information to search CDDB or the like has been recorded in this file. The system controller 100 accesses the site on the Internet such as CDDB or the like via an external apparatus, for example, a personal computer connected to the external control signal input/output unit 500.

A file name is Tocdb and this file consists of 13 blocks (one block, 16 kB). Each block is constructed by a BLK record (8 bytes, fixed length), ALBUM TOC records (412 bytes, fixed length (39 records)), and a RESERVED record (308 bytes, fixed length (0x00, fixed)). Although 507 (=39×13) ALBUM TOC records can be recorded, in the embodiment of the invention, it is assumed that up to 500 records are validated and the subsequent records are set to invalid data (0x00, fixed). A file size is equal to 13 blocks×16384= 212992 bytes (208 kB).

FIG. 34 shows a construction of the block record. BLK-ID is set to a fixed character string "TOCO" and a block serial number is assumed to be a serial number from 1. The number of albums is equal to the number (1~500) of ALBUM TOC records.

FIG. 35 shows a construction of the Album TOC record. As shown in FIG. 35, the Album TOC record is constructed by TOCDB IDX, a using state, and TOC information.

FIG. 36 shows details of the TOC information. As shown in FIG. 36, the TOC information is constructed by Trk No. (1 byte), AMIN (1 byte), ASEC (1 byte), and AFRAME (1 byte). Trk No. indicates a track number in a range from 1 to 20000. AMIN, ASEC, and AFRAME denote an absolute time minute component, an absolute time second component, an absolute time frame number of the track corresponding to the track number recorded in Trk No., respectively.

There is a correlation between the ALBUM TOC record of Tocdb and the TRK record portion (TOCDB IDX, TOC TNO) of Playtime. That is, according to the track information of Playtime, to which TNO of TOC in Tocdb the track corresponds can be recognized. Therefore, even if editing, deletion, or the like of the audio file occurs, the correct music piece name can be obtained from CDDB.

In the HD recording and reproducing apparatus 300 according to the embodiment of the invention, as mentioned above, the editing operation can be executed. As editing operations, there are division of a music piece (track), combination of the music pieces (tracks), erasure of the music piece (track), erasure of the album, movement of the music piece, movement of an album, addition of the album name, addition of the artist name of the album, addition of the name of the music piece (track), and addition of the artist name of the music piece (track). After those editing operations, updating of the database excluding Tocdb is certainly executed every editing and those databases are always managed so that a difference is not caused between the substance and the database.

Figure 37:
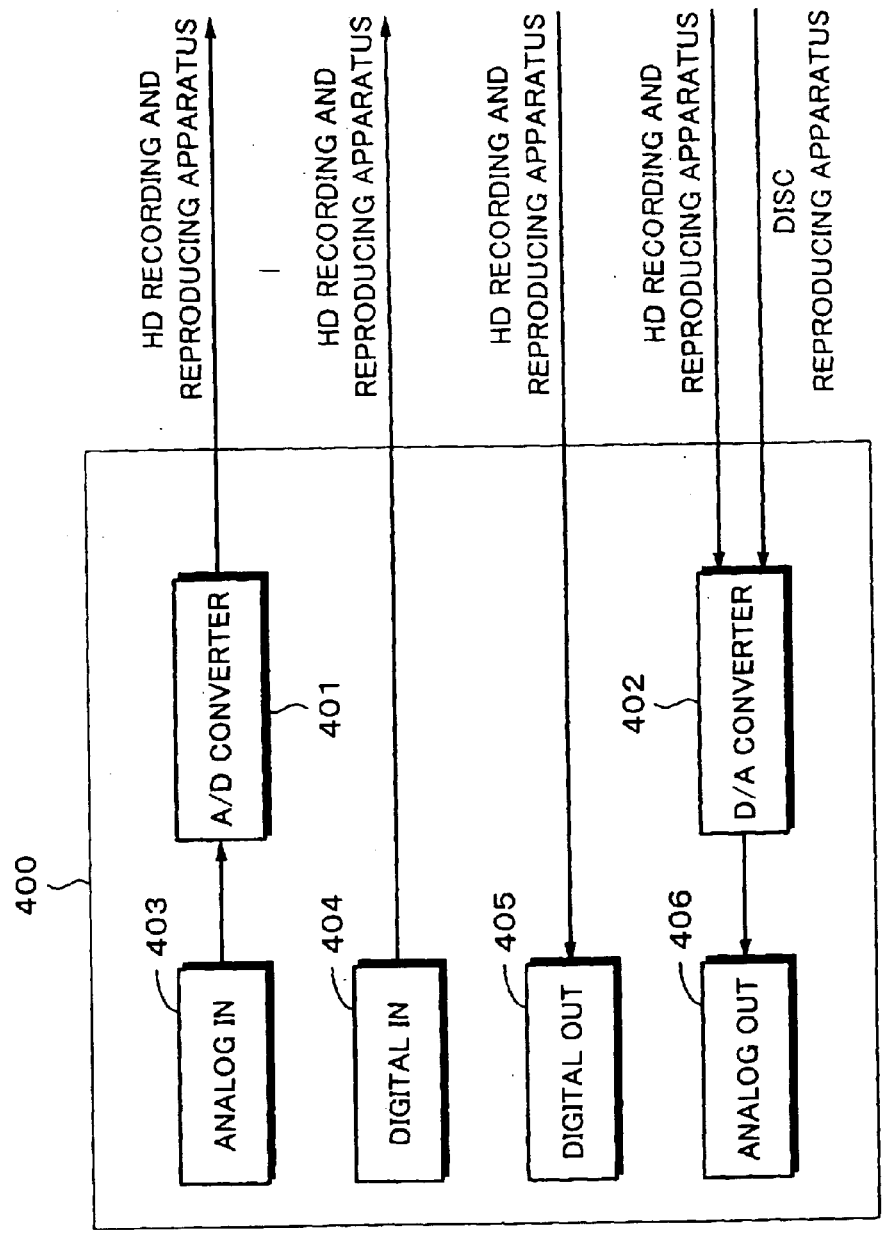
FIG. 37 is a block diagram showing an example of a construction of an audio input/output unit according to the embodiment of the invention.

FIG. 37 is a block diagram showing an example of a structure of the audio input/output unit 400. As shown in FIG. 37, the audio input/output unit 400 comprises an A/D converter 401, the D/A converter 402, an analog input terminal 403, a digital input terminal 404, a digital output terminal 405, and an analog output terminal 406. The A/D converter 401 converts an analog signal which is supplied from the analog input terminal 403 into a serial signal synchronized with an LR clock and a bit clock and supplies it to the AD/DA I/F 302 provided for the HD recording and reproducing apparatus 300.

The D/A converter 402 D/A converts the audio data, for example, audio data in the IEC 60958 format which is supplied from the disc reproducing apparatus 200 or the HD recording and reproducing apparatus 300 and supplies it to the analog output terminal 406. The D/A converter 402 not only outputs the audio data but also mutes the audio data if there is an instruction from the disc reproducing apparatus 200 or HD recording and reproducing apparatus 300.

The analog input terminal 403 is a terminal for inputting the analog signal. The analog signal supplied to the analog input terminal 403 is supplied to the A/D converter 401.

The digital input terminal 404 is a terminal for inputting a digital signal. The digital signal inputted to the digital input terminal 404 is supplied to the digital audio I/F 301 provided for the HD recording and reproducing apparatus 300.

When the HD recording and reproducing apparatus 300 is in a recording mode, those audio signals inputted to the HD recording and reproducing apparatus 300 are outputted as a monitor sound from the analog output terminal 406, which will be explained hereinlater.

The digital output terminal 405 is a terminal for outputting the digital audio signal supplied from the digital audio I/F 301 provided for the HD recording and reproducing apparatus 300 to the external apparatus or the like.

The analog output terminal 406 is a terminal for outputting the analog signal supplied from the D/A converter 402 to the external apparatus or the like.

The external control signal input/output unit 500 enables communication to be made between the external apparatus, for example, a personal computer and the dubbing apparatus and is, for example, a USB (Universal Serial Bus) connector.

In the dubbing apparatus according to the embodiment of the invention, a music (track) can be registered into the play list by a method whereby after a play list register key provided for the operating apparatus 103 was pressed, the music (track) to be registered into the play list and a registration destination play list of this music (track) are selected by using a jog key or the like. In the dubbing apparatus according to the embodiment of the invention, the music (track) which is being reproduced can be easily registered into the play list. A play list registering method will be described hereinbelow.

Figure 38:
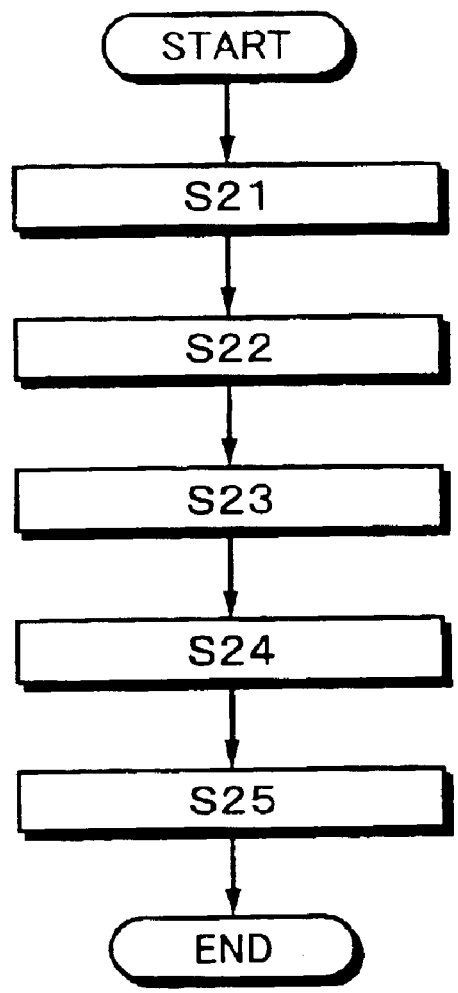
FIG. 38 is a flowchart for explaining place registering operation and process in the dubbing apparatus according to the embodiment of the invention.

FIG. 38 is a flowchart for explaining an example of the registering operation and process for registering the music (track) which is being reproduced into the play list. An example in which a track 2 of an album 2 (album 2 reproduction management file) is registered into a play list 2 (play list 2 management file) is shown here.

First, the jog key provided for the operating apparatus 103 is properly operated and the track 2 of the album 2 is reproduced (step 21).

Subsequently, the play list register key provided for the operating apparatus 103 of the system controller 100 is pressed (step 22). Thus, the registration into the play list is started and a message "registration destination play list?" for urging the user to select a play list registration destination file is displayed (step 23).

Subsequently, the play list 2 is selected as a registration destination play list by using the operating apparatus 103 of the system controller 100 (step 24). Thus, information of the play list 2 management file Pb0001f6 is updated (step 25). The play list registering operation and process are finished.

Although the example in which the user selects the registration destination play list has been shown in the foregoing registering method, the registration destination play list can be also preliminarily selected by default. By this method, after the play list register key provided for the system controller 100 was pressed in step 22, for example, by pressing again the play list register key provided for the system controller 100, the music (track) which is being reproduced can be registered into the play list. That is, merely by reproducing the music (track) to be registered into the play list and pressing the play list register key twice, the music (track) which is being reproduced can be easily registered into the play list.

In addition to the function to start the registration into the play list, a function to register the music (track) which is being reproduced into the play list can be also provided for the play list register key. By providing such a function for the play list register key, merely by pressing the play list register key once, the music (track) which is being reproduced can be easily registered into the play list.

The editing operation of the dubbing apparatus according to the embodiment of the invention will now be described.

As mentioned above, in the dubbing apparatus according to the embodiment of the invention, the audio data stored in the HD recording and reproducing apparatus 300 can be edited. The operations for the track erasure, combination, division, and album erasure will now be described as editing operations.

FIG. 39 is a table showing the numbers of the albums and the number of tracks included in each album before the editing operation. In FIG. 39, the albums 1, 2, ..., and 500 indicate the album 1 management file, the album 2 management file, ..., and the album 500 management file shown in FIG. 12, respectively.

FIG. 40 is a table showing a link destination of the track registered in each play list before the editing operation. In FIG. 40, play lists (P. List) 501, 502, ..., and 510 indicate a play list 1 management file, a play list 2 management file, ..., and a play list 10 management file shown in FIG. 12, respectively.

Figure 41:
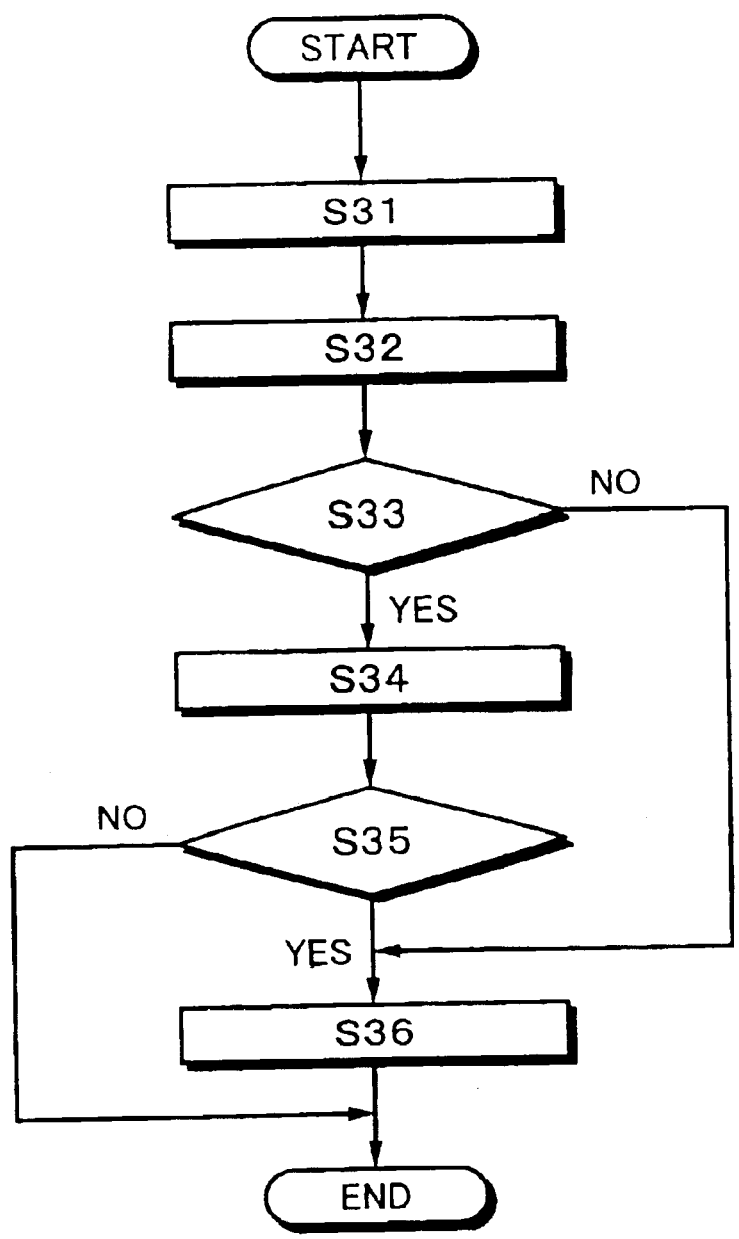
FIG. 41 is a flowchart for explaining the operation and process for track erasing editing in the dubbing apparatus according to the embodiment of the invention.

FIG. 41 is a flowchart for explaining the operation and process for track erasure in the dubbing apparatus according to the embodiment of the invention. The case of erasing the music (track) corresponding to the album No. 3 and the track No. 4 is shown here as an example. The music (track) corresponding to the album No. 3 and the track No. 4 have been registered in the track 4 in the play list 502.

First, the user presses a menu key provided for the operating apparatus 103, displays a menu picture plane onto the display apparatus 102, and selects "erase track" from the menu picture plane (step S31).

Subsequently, the user properly operates the jog key provided for the operating apparatus 103 and enters the album number and the track number of the track which he wants to erase (step S32). The album No. 3 and the track No. 4 are inputted here.

Subsequently, the controller 101 discriminates whether the track corresponding to the album number and the track number inputted in step S32 has been registered in the play list or not (step S33). If it is determined that the relevant track is not registered in the play list yet, step S36 follows. If it is determined that the relevant track has been registered in the play list, a message "registered in the play list" to warn the user that the track which he wants to erase has been registered in the play list is displayed onto the display apparatus 102 (step S34).

Subsequently, the controller 101 discriminates whether an erasing instruction has been committed by the user or not on the basis of a signal which is supplied from the operating apparatus 103 (step S35). If the erasing instruction is not committed yet, the erasing operation and process are finished. If the erasing instruction has been committed, the track corresponding to the album number and the track number inputted in step S32 and the information of the track registered in the track 4 in the play list 502 are erased (step S36).

FIG. 42 is a table showing a link destination of the track registered in each play list after the erasing operation. As shown in FIG. 42, the track 4 of the play list 502 shown in FIG. 40 is erased by the foregoing erasing operation.

Figure 43:
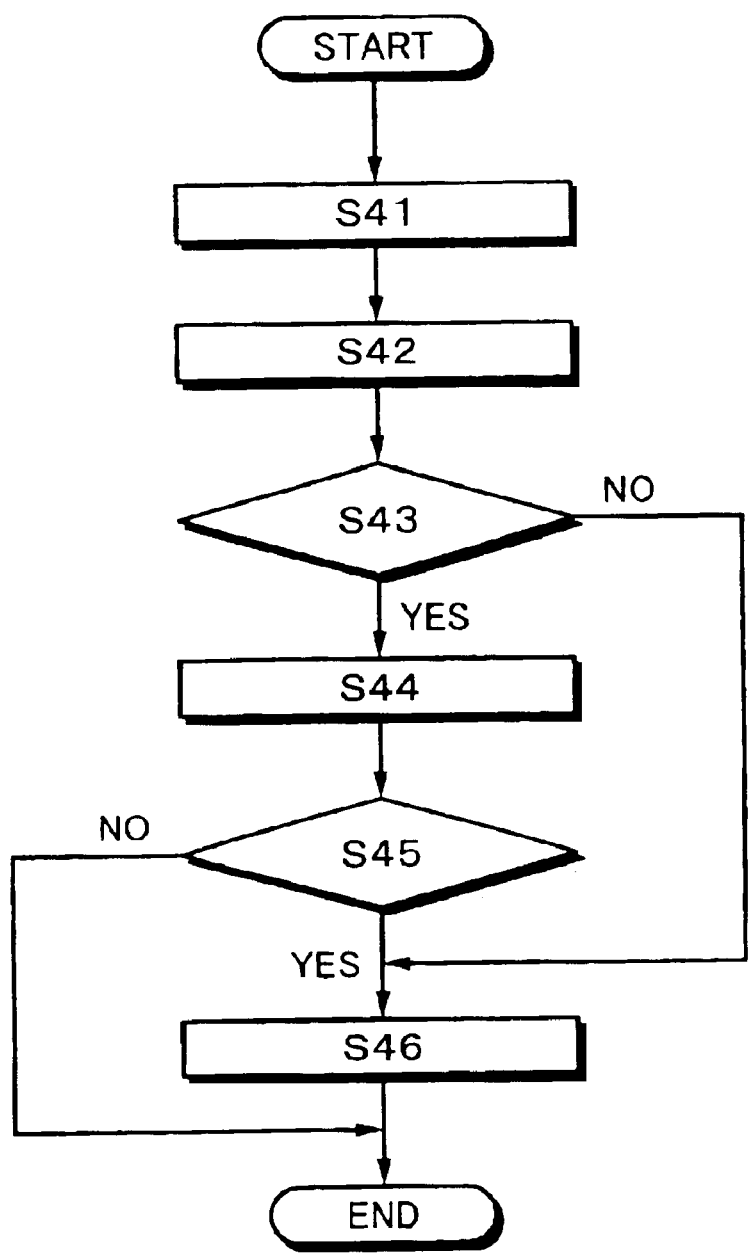
FIG. 43 is a flowchart for explaining the operation and process for combination editing in the dubbing apparatus according to the embodiment of the invention.

FIG. 43 is a flowchart for explaining the operation and process for combining in the dubbing apparatus according to the embodiment of the invention. The case of combining the track corresponding to the album No. 23 and the track No. 1 with the track corresponding to the album No. 23 and the track No. 18 is shown as an example. The track corresponding to the album No. 23 and the track No. 18 has been registered in the track 1 in the play list 501 and the track 2 in the play list 502.

First, the user presses the menu key provided for the operating apparatus 103, displays the menu picture plane onto the display apparatus 102, and selects "combining operation" from the menu picture plane (step S41).

Subsequently, the user properly operates the jog key provided for the operating apparatus 103 and enters the album number and the track number of the track which he wants to combine (step S42). The album No. 3, the track No. 4, the album No. 23, and the track No. 18 are inputted here.

Subsequently, the controller 101 discriminates whether the track corresponding to the album number and the track number inputted in step S42 has been registered in the play list or not (step S43). If it is determined that the relevant track is not registered in the play list yet, step S46 follows. If it is determined that the relevant track has been registered in the play list, the message "registered in the play list" to warn the user that the tracks which he wants to combine have been registered in the play list is displayed onto the display apparatus 102 (step S44).

Subsequently, the controller 101 discriminates whether a combining instruction has been committed by the user or not on the basis of a signal which is supplied from the operating apparatus 103 (step S45). If the combining instruction is not committed yet, the combining operation and process are finished. If the combining instruction has been committed, the tracks corresponding to the album numbers and the track numbers inputted in step S42 are combined and the information of the track registered in the track 1 in the play list 501 and the information of the track registered in the track 1 in the play list 502 are erased (step S46).

FIG. 44 is a table showing a link destination of the track registered in each play list after the combining operation. As shown in FIG. 44, the track 1 in the play list 501 and the track 1 in the play list 502 shown in FIG. 40 are erased by the combining operation.

Figure 45:
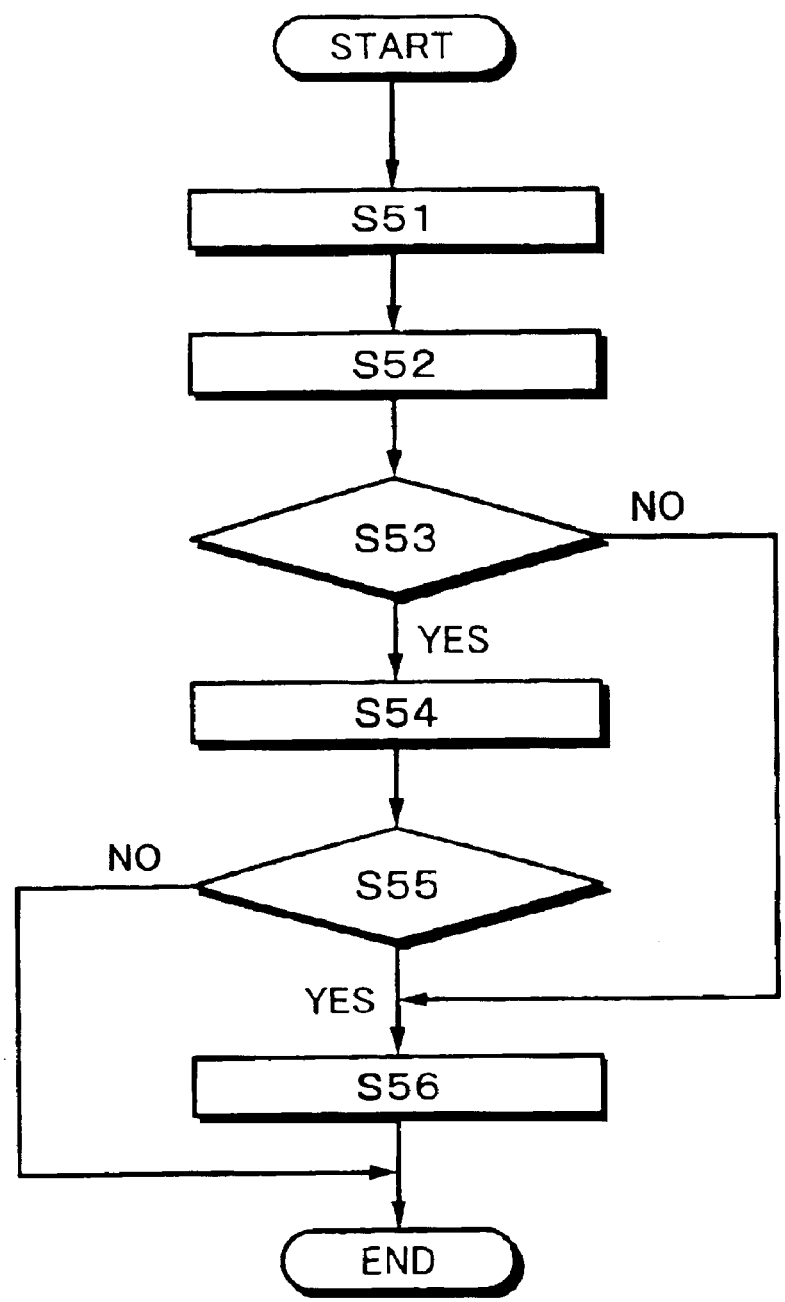
FIG. 45 is a flowchart for explaining the operation and process for dividing editing in the dubbing apparatus according to the embodiment of the invention.

FIG. 45 is a flowchart for explaining the operation and process for division in the dubbing apparatus according to the embodiment of the invention. The case of dividing the track corresponding to the album No. 1 and the track No. 1 is shown here as an example. The track corresponding to the album No. and the track No. 1 has been registered in the track 3 in the play list 502 and the track 1 in the play list 510.

First, the user presses the menu key provided for the operating apparatus 103, displays the menu picture plane onto the display apparatus 102, and selects "dividing operation" from the menu picture plane (step S51).

Subsequently, the user properly operates the jog key by which the division is desired and which is provided for the operating apparatus 103, thereby reproducing the track corresponding to the album No. 1 and the track No. 1 which the user wants to operate, a point at which the division is desired is reproduced and, at the same time, the jog key is pressed (step S52).

Subsequently, the controller 101 discriminates whether the track corresponding to the album number and the track number inputted in step S52 has been registered in the play list or not (step S53). If it is determined that the relevant track is not registered in the play list yet, step S56 follows. If it is determined that the relevant track has been registered in the play list, the message "registered in the play list" to warn the user that the track which he wants to divide has been registered in the play list is displayed onto the display apparatus 102 (step S54).

Subsequently, the controller 101 discriminates whether a dividing instruction has been committed by the user or not on the basis of a signal which is supplied from the operating apparatus (step S55). If the dividing instruction is not committed yet, the editing process is finished. If the dividing instruction has been committed, the track is divided at the point instructed in step S52 and the information of the track registered in the track 4 in the play list 502 and the information of the track registered in the track 1 in the play list 510 are erased (step S56).

FIG. 46 is a table showing a link destination of the track registered in each play list after the dividing operation. As shown in FIG. 46, the track 4 in the play list 502 and the track 1 in the play list 510 shown in FIG. 40 are erased by the dividing operation mentioned above.

Figure 47:
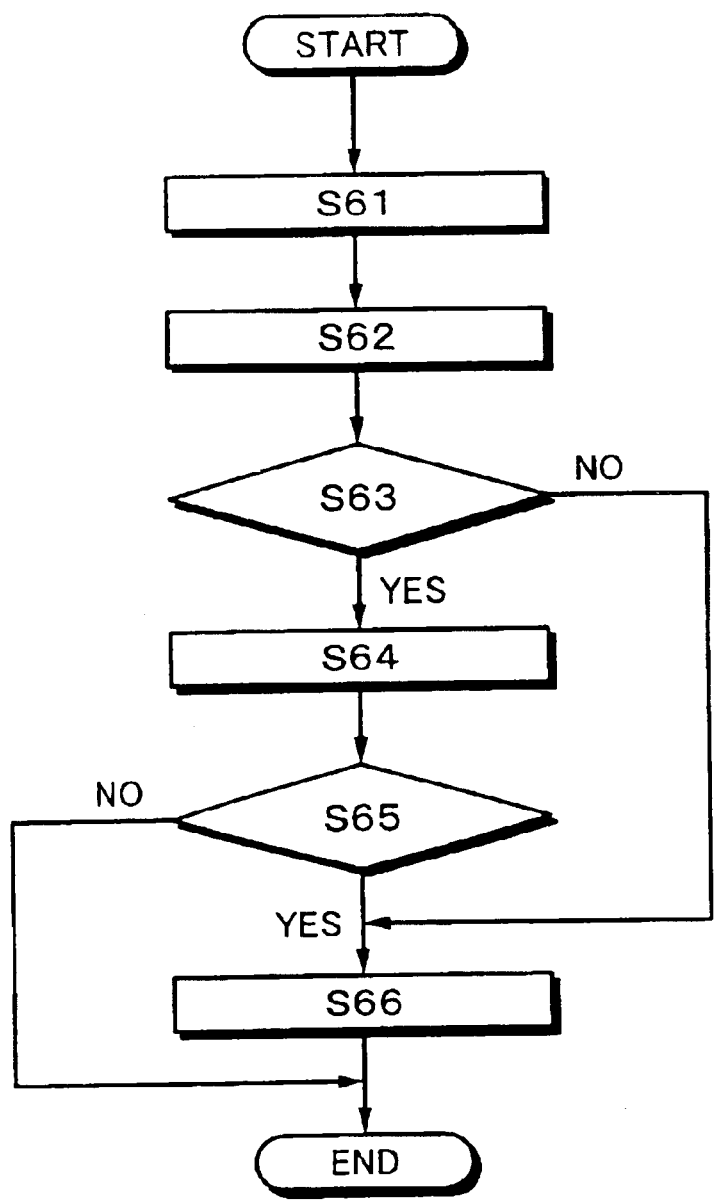
FIG. 47 is a flowchart for explaining the operation and process for album erasing editing in the dubbing apparatus according to the embodiment of the invention.

FIG. 47 is a flowchart for explaining the operation and process for album erasure editing in the dubbing apparatus according to the embodiment of the invention. The case of erasing the album 47 is shown here as an example. The track 4 of the album 47 and 128 of the album 47 have been registered in the track 2 in the play list 505 and the track 4 in the play list 510, respectively.

First, the user presses the menu key provided for the operating apparatus 103, displays the menu picture plane onto the display apparatus 102, and selects "erase album" from the menu picture plane (step S61).

Subsequently, the user properly operates the jog key provided for the operating apparatus 103 and enters the album number of the album in which he wants to erase the album (step S62). The album No. 47 is inputted here.

Subsequently, the controller 101 discriminates whether the track corresponding to the album number and the track number inputted in step S62 has been registered in the play list or not (step S63). If it is determined that the relevant track is not registered in the play list yet, step S66 follows. If it is determined that the relevant track has been registered in the play list, the message "registered in the play list" to warn the user that the track in which he wants to erase the album has been registered in the play list is displayed onto the display apparatus 102 (step S64).

Subsequently, the controller 101 discriminates whether an erasing instruction has been committed by the user or not on the basis of a signal which is supplied from the operating apparatus (step S65). If the erasing instruction is not committed yet, the editing operation is finished. If the erasing instruction has been committed, the track included in the album of the album No. 47 inputted in step S52 is erased and the information of the track registered in the track 2 in the play list 505 and the information of the track registered in the track 4 in the play list 510 are erased (step S66).

FIG. 48 is a table showing a link destination of the track registered in each play list after the erasure. As shown in FIG. 48, the track 2 in the play list 505 and the track 4 in the play list 510 shown in FIG. 40 are erased by the album erasure mentioned above.

As described above, according to the embodiment of the invention, when the user instructs the editing of a music file (track) recorded in the HD recording and reproducing apparatus 300, the system controller 100 erases the information regarding the music file (track) whose editing has been instructed from the play list, so that it is possible to prevent the music file (track) whose link destination does not exist from being caused in the play list. That is, a state where the music file (track) registered in the play list cannot be reproduced by the editing can be prevented.

According to the embodiment of the invention, when the user instructs the editing of the music file recorded in the HD recording and reproducing apparatus 300, the system controller 100 displays the information to notify the user that the music file (track) whose editing was instructed has been registered in the play list onto the display apparatus 102, so that the user can confirm whether the predetermined program whose editing was instructed has been registered in the management information or not. Therefore, the erroneous editing operation to the music file (track) registered in the play list can be prevented.

Although the embodiment of the invention has specifically been described above, the invention is not limited to the foregoing embodiment but various modifications based on the technical idea of the invention are possible.

For example, according to the foregoing embodiment, when the erasure is instructed to the predetermined music piece belonging to the predetermined group, whether the music piece as an erasure target has been registered in the play list or not is discriminated, and if the target music piece has been registered, the warning is displayed. However, as a modification, it is also possible to construct in a manner such that although the music piece whose erasure has been instructed is erased from the group, it is not erased from the play list. In this case, in the group, it is sufficient to edit (erase) the management of the recording position to the music piece as an erasure target and manage the substance in the play list. In the embodiment, the substance management of the recording position or the like is made by group management and, on the play list side, the group number and the track number to which the music piece belongs are merely managed and the substance management is not made. However, it is also possible to construct in a manner such that if the substance management is made also on the play list side, the linked erasure is not performed. Thus, it is also possible to construct in a manner such that even if the music piece is erased on the group side, the play list side is not influenced.

In the foregoing embodiment, the example of applying the invention to the editing operation such as erasure, combination, division, or the like which is executed to the track or album registered in the play list and to the dubbing apparatus which can execute the editing operation has been shown. However, the invention is not limited to such an example. That is, the invention can be applied to the (erase) editing operation for erasing the music file registered in the play list from the hard disk and to the dubbing apparatus which can execute the editing operation. The invention can be also applied to the (division, combination) editing operation for changing the size of music registered in the play list and to the dubbing apparatus which can execute the editing operation. Specifically speaking, the invention can be applied to the editing operation by which the number of Fno on the destination side shown by TRK-xxx of the play list management files Pb0001f5 to Pb0001fe is changed or, even if the number is not changed, the size of the relevant Fno is changed and to the dubbing apparatus which can execute the editing operation.

Although the example of warning the user that the track which the user instructed to editing has been recorded in the HD recording and reproducing apparatus 300 has been shown in the foregoing embodiment, it is also possible that such a warning is not made. That is, it is also possible to construct in a manner such that if the editing of the music file recorded in the HD recording and reproducing apparatus 300 is instructed, the system controller 100 executes the editing instructed by the user without warning the user that the file whose editing was instructed via the display apparatus 102 has been registered in the play list.

Although the case where the divided track is erased from the play list in the case where the track is divided has been shown in the foregoing embodiment, the two tracks after the division can be also newly registered into the play list, or one of the two tracks after the division can be also registered into the play list.

Although the case where the combined track is erased from the play list in the case where the tracks are combined has been shown in the foregoing embodiment, the tracks after the combination can be also newly registered into the play list.

As described above, according to the invention, if the editing is instructed to the predetermined program recorded in the program area, whether the management information of the predetermined program has been managed in the management area or not is discriminated. If it is determined that the management information has been managed in the management area, before the predetermined program is edited, the user is warned that the predetermined program whose editing was instructed has been managed in the management area. Therefore, the user can confirm whether the predetermined program whose editing was instructed has been registered in the management area or not. Thus, the erroneous editing operation to the program managed in the management area can be prevented.

It is also possible to prevent the management information of the program which is not recorded in the program area from being caused in the management area. That is, a state where the program managed in the management area cannot be reproduced due to the editing can be prevented.

Description of Reference Numerals

100 SYSTEM CONTROLLER
101 CONTROLLER
102 DISPLAY APPARATUS
103 OPERATING APPARATUS
200 DISC REPRODUCING APPARATUS
201 SPINDLE MOTOR
202 OPTICAL HEAD
203 RF AMPLIFIER
204 SERVO CIRCUIT
205 SLED
206 EFM & CIRC DECODING CIRCUIT
207 CONTROLLER
300 HD RECORDING AND REPRODUCING APPARATUS
301 DIGITAL AUDIO I/F
302 AD/DA I/F
303 ENCODING/DECODING APPARATUS
304 MAGIC GATE CORE
305 SHARED RAM
306 HD CONTROLLER
307 SDRAM
308 FAT32 FILE SYSTEM
309 HDD
400 AUDIO INPUT/OUTPUT UNIT
401 A/D CONVERTER
402 D/A CONVERTER
403 ANALOG INPUT TERMINAL
404 DIGITAL INPUT TERMINAL
405 DIGITAL OUTPUT TERMINAL
406 ANALOG OUTPUT TERMINAL
500 EXTERNAL SIGNAL INPUT/OUTPUT UNIT
S1 FORM NEW FILE
S2 COMPRESS
S3 ENCRYPT
S4 TRANSFER MUSIC DATA FROM SHARED RAM 305 TO SDRAM 307
S5 TRANSFER MUSIC DATA FROM SDRAM 307 TO SHARED RAM 305
S11 OPEN REPRODUCTION FILE
S12 TRANSFER MUSIC DATA FROM HDD 309 TO SHARED RAM 305
S13 TRANSFER MUSIC DATA FROM SDRAM 307 TO SHARED RAM 305
S14 DECODED
S15 DECOMPRESS
S21 REPRODUCE TRACK 2 OF ALBUM 2
S22 PLAY LIST REGISTER KEY
S23 DISPLAY "REGISTRATION DESTINATION PLAT LIST"
S24 SELECT PLAY LIST 2
S25 UPDATED PLAY LIST 2 MANAGEMENT FILE
S31 PRESS MENU KEY
S32 INPUT ALBUM NO. AND TRACK NO.
S33 REGISTERED IN PLAY LIST?
S34 DISPLAY "REGISTERED IN PLAY LIST"
S35 ERASING INSTRUCTION HAS BEEN COMMITTED?
S36 TRACK ERASING PROCESS
S41 PRESS MENU KEY
S42 INPUT ALBUM NO. AND TRACK NO.
S43 REGISTERED IN PLAY LIST?
S44 DISPLAY "REGISTERED IN PLAY LIST"
S45 COMBINING INSRTUCTION HAS BEEN COMMITTED?
S46 COMBINING PROCESS
S51 PRESS MENU KEY
S52 DESIGNATE DIVIDING POINT
S53 REGISTERED IN PLAY LIST?
S54 DISPLAY "REGISTERED IN PLAY LIST"
S55 DIVIDING INSTRUCTION HAS BEEN COMMITTED?
S56 DIVIDING PROCESS
S61 PRESS MENU KEY
S62 INPUT ALBUM NO.
S63 REGSITERED IN PLAY LIST?
S64 DISPLAY "REGISTERED IN PLAY LIST"
S65 ERASING INSTRUCTION HAS NBEEN COMMITTED?
S66 ALBUM ERASING PROCESS

What is claimed is:

1. An editing apparatus for editing a program recorded on a recording medium having a program area in which a plurality of programs have been recorded and a management area in which first management information for collecting said plurality of programs recorded in said program area into groups and managing every group and second management information for collecting desired programs from said plurality of programs recorded in said program area and grouping the collected programs have been recorded, comprising:

operating means for instructing erasure to a predetermined program belonging to a predetermined group recorded in said program area;

discriminating means for discriminating whether the predetermined program whose erasure has been instructed by said operating means has been managed by said second management information or not; and notifying means for, if it is determined by said discriminating means that the predetermined program whose erasure has been instructed by said operating means has been managed by said second management information, warning before an erasing operation is executed.

2. An editing apparatus according to claim 1, wherein said first management information manages a recording position on said recording medium of each of said programs, and in said second management information, a number of the group to which the collected programs belong and serial numbers in said group are managed.

3. An editing apparatus according to claim 1, further comprising control means for editing said first management information and said second management information if the erasing instruction is confirmed and the erasing instruction is committed after the warning was made by said notifying means.

4. An editing apparatus according to claim 2, further comprising control means for, if the erasing instruction is confirmed and the erasing instruction is committed after the warning was made by said notifying means, erasing information of the recording position corresponding to the program whose erasure has been instructed from said first management information and erasing the number of the group corresponding to the program whose erasure has been instructed from said second management information and the serial numbers in said group.

5. An editing method of editing a program recorded on a recording medium having a program area in which a plurality of programs have been recorded and a management area in which first management information for collecting said plurality of programs recorded in said program area into groups and managing every group and second management information for collecting desired programs from said plurality of programs recorded in said program area and grouping the collected programs have been recorded, comprising:
 a first discriminating step of discriminating whether erasure has been instructed to a predetermined program belonging to a predetermined group recorded in said program area or not;
 second discriminating means for, if it is determined in said first discriminating step that the erasure has been instructed, discriminating whether the predetermined program whose erasure was instructed has been managed by said second management information or not; and
 a notifying step of, if it is determined by said second discriminating means that said predetermined program whose erasure was instructed has been managed by said second management information, warning before an erasing operation is executed.

6. An editing method according to claim 5, wherein said first management information manages a recording position on said recording medium of each of said programs, and in said second management information, a number of the group to which the collected programs belong and serial numbers in said group are managed.

7. An editing method according to claim 5, further comprising an editing step of editing said first management information and said second management information if the erasing instruction is confirmed and the erasing instruction is committed after the warning was made by said notifying step.

8. An editing method according to claim 6, further comprising a control step of, if the erasing instruction is confirmed and the erasing instruction is committed after the warning was made by said notifying step, erasing information of the recording position corresponding to the program whose erasure has been instructed from said first management information and erasing the number of the group corresponding to the program whose erasure has been instructed from said second management information and the serial numbers in said group.

9. An editing apparatus for editing a program recorded on a recording medium having a program area in which a plurality of programs have been recorded and a management area in which first management information for collecting said plurality of programs recorded in said program area into groups and managing every group and second management information for collecting desired programs from said plurality of programs recorded in said program area and grouping the collected programs have been recorded, comprising:
 operating means for instructing editing to a predetermined program belonging to a predetermined group recorded in said program area;
 discriminating means for discriminating whether the predetermined program whose editing has been instructed by said operating means has been managed by said second management information or not; and
 notifying means for, if it is determined by said discriminating means that the predetermined program whose editing has been instructed by said operating means has been managed by said second management information, warning before an editing operation is executed.

10. An editing apparatus according to claim 9, where in said first management information manages a recording position on said recording medium of each of said programs, and in said second management information, a number of the group to which the collected programs belong and serial numbers in said group are managed.

11. An editing apparatus according to claim 9, further comprising control means for editing said first management information and said second management information if the editing instruction is confirmed and the editing instruction is committed after the warning was made by said notifying means.

12. An editing apparatus according to claim 10, further comprising control means for, if the editing instruction is confirmed and the editing instruction is committed after the warning was made by said notifying means, editing information of the recording position corresponding to the program whose editing has been instructed from said first management information and erasing the number of the group corresponding to the program whose editing has been instructed from said second management information and the serial numbers in said group.

13. An editing apparatus according to claim 9, wherein said editing is editing for erasing the program.

14. An editing apparatus according to claim 9, wherein said editing is editing for combining the programs.

15. An editing apparatus according to claim 9, wherein said editing is editing for dividing the program.

16. An editing apparatus according to claim 1, wherein said editing is editing f or erasing the group which is managed by said first management information.

17. An editing apparatus according to claim 1, wherein said editing is editing for dividing the program.

18. An editing method of editing a program recorded on a recording medium having a program area in which a plurality of programs have been recorded and a management area in which first management information for collecting said plurality of programs recorded in said program area into groups and managing every group and second management information for collecting desired programs from said plurality of programs recorded in said program area and grouping the collected programs have been recorded, comprising:
 a first discriminating step of discriminating whether editing has been instructed to a predetermined program belonging to a predetermined group recorded in said program area or not;
 second discriminating means for, if it is determined in said first discriminating step that the editing has been instructed, discriminating whether the predetermined program whose editing was instructed has been managed by said second management information or not; and a notifying step of, if it is determined by said second discriminating means that the predetermined program whose editing was instructed has been managed by said second management information, warning before an editing operation is executed.

19. An editing method according to claim 18, wherein said first management information manages a recording position on said recording medium of each of said programs, and in said second management information, a number of the group to which the collected programs belong and serial numbers in said group are managed.

20. An editing method according to claim 18, further comprising an editing step of editing said first management information and said second management information if the editing instruction is confirmed and the editing instruction is committed after the warning was made by said notifying step.

21. An editing method according to claim 19, further comprising a control step of, if the editing instruction is confirmed and the editing instruction is committed after the warning was made by said notifying step, changing information of the recording position corresponding to the program whose editing has been instructed from said first management information and erasing the number of the group corresponding to the program whose editing has been instructed from said second management information and the serial numbers in said group.

22. An editing method according to claim 18, wherein said editing is editing for erasing the program.

23. An editing method according to claim 18, wherein said editing is editing for combining the programs.

24. An editing method according to claim 18, wherein said editing is editing for dividing the program.

25. An editing method according to claim 1, wherein said editing is editing for erasing the group which is managed by said first management information.

26. An editing method according to claim 18, wherein said editing is editing for dividing the program.

* * * * *